(12) United States Patent
Uchino et al.

(10) Patent No.: US 11,284,280 B2
(45) Date of Patent: Mar. 22, 2022

(54) USER APPARATUS, BASE STATION, AND TIME DIFFERENCE INFORMATION NOTIFICATION METHOD

(71) Applicant: NTT DOCOMO, INC., Tokyo (JP)

(72) Inventors: Tooru Uchino, Tokyo (JP); Kunihiko Teshima, Tokyo (JP); Hiroshi Chin, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/318,918

(22) PCT Filed: Jun. 16, 2015

(86) PCT No.: PCT/JP2015/067361
§ 371 (c)(1),
(2) Date: Dec. 14, 2016

(87) PCT Pub. No.: WO2015/194570
PCT Pub. Date: Dec. 23, 2015

(65) Prior Publication Data
US 2017/0134976 A1 May 11, 2017

(30) Foreign Application Priority Data
Jun. 17, 2014 (JP) .............................. JP2014-124835

(51) Int. Cl.
*H04W 24/08* (2009.01)
*H04W 36/00* (2009.01)
(Continued)

(52) U.S. Cl.
CPC .............. *H04W 24/08* (2013.01); *H04L 67/32* (2013.01); *H04L 67/34* (2013.01); *H04W 16/32* (2013.01);
(Continued)

(58) Field of Classification Search
None
See application file for complete search history.

(56) References Cited

U.S. PATENT DOCUMENTS

| 2008/0189970 A1 | 8/2008 | Wang et al. |
| 2009/0122730 A1* | 5/2009 | Yang ..................... H04W 36/30 370/280 |

(Continued)

FOREIGN PATENT DOCUMENTS

| CN | 101682852 A | 3/2010 |
| CN | 101682853 A | 3/2010 |

(Continued)

OTHER PUBLICATIONS

Office Action issued in corresponding Japanese Application No. 2016-529385, dated Oct. 17, 2017 (5 pages).

(Continued)

*Primary Examiner* — Chi H Pham
*Assistant Examiner* — Raul Rivas
(74) *Attorney, Agent, or Firm* — Osha Bergman Watanabe & Burton LLP

(57) ABSTRACT

A user apparatus for use in a mobile communication system including a first base station and a second base station that communicate with the user apparatus by inter-base station carrier aggregation, including: measurement means configured to measure a time difference between a subframe in the first base station and a subframe in the second base station; and notification means configured, when detecting a predetermined notification trigger, to notify the first base station or the second base station of time difference information on the time difference measured by the measurement means.

2 Claims, 19 Drawing Sheets

(51) Int. Cl.
| | |
|---|---|
| *H04L 67/60* | (2022.01) |
| *H04W 16/32* | (2009.01) |
| *H04W 24/10* | (2009.01) |
| *H04L 67/00* | (2022.01) |
| *H04W 72/04* | (2009.01) |
| *H04W 36/08* | (2009.01) |

(52) U.S. Cl.
CPC ....... *H04W 24/10* (2013.01); *H04W 36/0088* (2013.01); *H04W 72/0453* (2013.01); *H04W 36/0069* (2018.08); *H04W 36/0085* (2018.08); *H04W 36/08* (2013.01)

(56) References Cited

U.S. PATENT DOCUMENTS

| | | | |
|---|---|---|---|
| 2010/0190487 A1 | 7/2010 | Wang et al. | |
| 2014/0286305 A1* | 9/2014 | Yamada | H04W 36/165 370/331 |
| 2015/0139056 A1* | 5/2015 | Wang | H04W 48/08 370/311 |
| 2015/0304925 A1* | 10/2015 | Hwang | H04L 5/00 370/331 |

FOREIGN PATENT DOCUMENTS

| | | |
|---|---|---|
| EP | 2152017 A1 | 2/2010 |
| JP | 2010-516185 A | 5/2010 |
| JP | 2011-166387 A | 8/2011 |
| WO | 2008/149534 A1 | 12/2008 |

OTHER PUBLICATIONS

Extended European Search Report issued in the counterpart European Patent Application No. 15809599.2, dated May 24, 2017 (11 pages).
Ericsson; "Acquisition of SeNB SFN in the dual connectivity"; 3GPP TSG RAN WG4 Meeting #71, R4-142726; Seoul, Korea; May 19-23, 2014 (3 pages).
Intel Corporation; "Discussion on SFN timing difference in Dual connectivity"; 3GPP TSG-RAN WG4 Meeting #71, R4-143028; Seoul, Korea; May 19-23, 2014 (7 pages).
Office Action issued in corresponding Japanese Application No. 2016-529385, dated May 30, 2017 (5 pages).
Office Action issued in the counterpart Australian Patent Application No. 2015277889, dated Sep. 15, 2017 (4 pages).
International Search Report issued in corresponding application No. PCT/JP2015/067361 dated Sep. 8, 2015 (4 Dages).
Written Opinion of the International Searching Authority issued in corresponding application No. PCT/JP2015/067361 dated Sep. 8, 2015 (6 pages).
Qualcomm Incorporated, "Measurement gap configuration in Dual Connectivity"; 3GPP TSG-RAN WG2 meeting #86, R2-142517; Seoul, Korea; May 19-23, 2014 (4 pages).
Huawei, HiSilicon, "SFN offset acquisition"; 3GPP TSG-RAN WG2 Meeting #86, R2-142095; Seoul, Korea; May 19-23, 2014 (4 pages).
Huawei, HiSilicon, "RRM measurements for SCG in dual connectivity"; 3GPP TSG-RAN WG2 Meeting #86, R2-142066; Seoul, Korea; May 19-23, 2014 (6 pages).
3GPP TS 36.300 V12.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Mar. 2014 (209 pages).
3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)"; Dec. 2013 (71 pages).
Office Action issued in the counterpart Japanese Patent Application No. 2016-529385, dated Mar. 6, 2018 (5 pages).
Office Action issued in corresponding Japanese Patent Application No. 2017-148243, dated Sep. 18, 2018 (7 pages).
Office Action issued in the counterpart Chinese Patent Application No. 201580031965.X, dated Jun. 12, 2019 (22 pages).
Office Action issued in corresponding Japanese Patent Application No. 2017-148243, dated Apr. 2, 2019 (6 pages).
Office Action issued in corresponding Japanese Patent Application No. 2017-148243, dated Nov. 5, 2019 (5 pages).
Office Action issued in the counterpart European Patent Application No. 15809599.2, dated Jun. 2, 2020 (9 pages).
Summons to attend oral hearing in counterpart European Patent Application No. 15809599.2 dated Feb. 8, 2021 (9 pages).
Chinese Office Action issued in the counterpart Chinese Patent Application No. 201580031965.X, dated Mar. 2, 2020 (18 pages).
Office Action issued in Chinese Application No. 201580031965.X; dated Sep. 11, 2020 (13 pages).

\* cited by examiner

CA

Subframe boundaries ALMOST ALIGN BETWEEN CCs

DC (ASYNCHRONOUS)

Subframe boundaries DO NOT NECESSARILY ALIGN BETWEEN CCs, AND ARE DISPLACED BY 1/2 subframe (500 $\mu$ sec) AT THE MAXIMUM

USER APPARATUS, BASE STATION, AND TIME DIFFERENCE INFORMATION NOTIFICATION METHOD

TECHNICAL FIELD

The present invention relates to a measurement gap (measurement gap) used in a mobile communication system such as LTE.

BACKGROUND ART

In a mobile communication system such as LTE, a user apparatus UE is caused to measure radio quality by performing measurement instruction using an RRC signal to the user apparatus UE, for causing the user apparatus UE to connect to a cell of better quality or for the purpose of load balancing and the like (non-patent document 1).

When measuring radio quality of a frequency different from a frequency used for communication, the user apparatus UE needs to perform RF tuning (radio tuning) for tuning a reception frequency to the target frequency. At the time, it is necessary to once interrupt the current communication. The period for interrupting the communication is called a measurement gap (measurement gap, hereinafter). As shown in FIG. 1, the user apparatus UE does not perform reception of DL signals and transmission of UL signals. The measurement gap is configured by measurement configuration information (Measurement configuration) received from a base station eNB such that the measurement gap periodically arrives.

Also, since the base station eNB ascertains timing at which the user apparatus UE performs measurement, the base station eNB stops DL/UL scheduling during that period.

In Rel-10, CA (Carrier aggregation) is introduced for improving throughputs by aggregating a plurality of CCs (component carriers). In 3GPP, it is defined that the user apparatus UE applies a single measurement gap configuration to every CC even in CA. That is, the user apparatus UE interrupts DL reception/UL transmission in all CCs during the measurement gap period. The reason is that, if a measurement gap is defined for each CC, implementation of the user apparatus UE becomes complicated.

In CA up to Rel-11, a plurality of CCs under the same base station eNB are used as shown in FIG. 2. In Rel-12, this is expanded so that Dual connectivity is proposed in which simultaneous communication is performed by using CCs under different base stations eNB to realize high throughputs (non-patent document 2). That is, in Dual connectivity, the user apparatus UE performs communication simultaneously using radio resources of two physically different base stations eNB.

Dual connectivity (to be referred to as DC hereinafter) is a kind of CA, and it is also referred to as Inter eNB CA (inter-base station carrier aggregation), in which Master-eNB (MeNB) and Secondary-eNB (SeNB) are introduced. FIG. 3 shows an example of DC. In the example of FIG. 3, the MeNB communicates with a user apparatus UE by CC #1, and the SeNB communicates with the user apparatus UE by CC #2, so that DC is realized.

In DC, a cell group formed by cell(s) (one or a plurality of cells) under an MeNB is called MCG (Master Cell Group), and a cell group formed by cell(s) (one or a plurality of cells) under an SeNB is called SCG (Secondary Cell Group). A cell of an SCG added first is called PSCell (primary SCell).

RELATED ART DOCUMENT

Non Patent Document

[NON PATENT DOCUMENT 1] 3GPP TS 36.300 V12.1.0 (2014 March)
[NON PATENT DOCUMENT 2] 3GPP TR 36.842 V12.0.0 (2013 December)

SUMMARY OF THE INVENTION

Problem to be Solved by the Invention

In the same way as the case of CA (CA that is not DC), also in DC, from the viewpoint of UE implementation simplification, it is assumed that a measurement gap in units of user apparatuses UE is applied without differentiating measurement gaps between the MCG and the SCG.

A measurement gap (SFN/subframe number which becomes a measurement gap) in LTE is calculated based on configuration information (gap pattern (including period information), gap offset). However, it is assumed that, at a certain time, there is a difference between a subframe (SFN/subframe number) in the MCG (MeNB) and a subframe (SFN/subframe number) in the SCG (SeNB).

Also, as shown in FIG. 4A, in CA (CA which is not DC), CCs to aggregate belong to the same base station eNB. Thus, subframe boundaries are synchronized (aligned). On the other hand, in DC, not only there is a difference of SFN/subframe number, like the above-mentioned one, between the MCG and the SCG, but also there is a possibility in that there is a difference of subframe boundaries between the MCG (including CC #1) and the SCG (including CC #2) as shown in FIG. 4B.

In DC, it is necessary to align measurement gaps between the MCG and the SCG in order to apply a measurement gap in units of user apparatuses UE. For the purpose of that, it is necessary that the base station eNB side ascertains the difference of time between the MCG and the SCG. However, there is no concrete conventional technique for it, so that the base station eNB cannot properly ascertain the difference.

The present invention is contrived in view of the above-mentioned points, and a main object of the present invention is, related to an embodiment, to provide a technique to enable a base station side to ascertain information of a time difference between a subframe of a first base station and a subframe of a second base station, in a mobile communication system including the first base station and the second base station that perform communication with a user apparatus by inter-base station carrier aggregation.

In relation to another embodiment, an object of the present invention is to provide a technique to enable to properly configure a measurement gap even when there is a difference in subframe boundaries between the first base station and the second base station.

Means for Solving the Problem

According to an embodiment of the present invention, there is provided a user apparatus for use in a mobile communication system including a first base station and a second base station that communicate with the user apparatus by inter-base station carrier aggregation, including:

measurement means configured to measure a time difference between a subframe in the first base station and a subframe in the second base station; and notification means configured, when detecting a predetermined notification trigger, to notify the first base station or the second base station of time difference information on the time difference measured by the measurement means.

According to an embodiment of the present invention, there is provided a user apparatus for use in a mobile communication system including a first base station and a second base station that communicate with the user apparatus by inter-base station carrier aggregation, including:

reception means configured to receive configuration information of a measurement gap from the first base station or the second base station; and measurement control means configured to configure a measurement gap for the first base station based on the configuration information, and to configure subframes that overlap with subframes that become the measurement gap for the first base station as a measurement gap for the second base station.

According to an embodiment of the present invention, there is provided a base station used as a second base station in a mobile communication system including a first base station and the second base station that communicate with a user apparatus by an inter-base station carrier aggregation, including:

reception means configured to receive, from the user apparatus or the first base station, time difference information on a time difference between a subframe in the first base station and a subframe in the second base station; and measurement control means configured to receive configuration information of a measurement gap from the user apparatus or the first base station, to calculate a measurement gap for the base station in the user apparatus based on the configuration information and the time difference information, and to regard a predetermined period before and after the measurement gap as a measurement gap.

According to an embodiment of the present invention, there is provided a base station used as a second base station in a mobile communication system including a first base station and the second base station that communicate with a user apparatus by an inter-base station carrier aggregation, including:

reception means configured to receive, from the user apparatus or the first base station, time difference information on a time difference between a subframe in the first base station and a subframe in the second base station; and measurement control means configured to calculate an absolute time of a measurement gap for the first base station in the user apparatus based on configuration information of the measurement gap and the time difference information received by the reception means, and to calculate a measurement gap for the base station in the user apparatus based on the absolute time.

According to an embodiment of the present invention, there is provided a time difference information notification method executed by a user apparatus for use in a mobile communication system including a first base station and a second base station that communicate with the user apparatus by inter-base station carrier aggregation, including:

a measurement step of measuring a time difference between a subframe in the first base station and a subframe in the second base station; and a notification step of, when detecting a predetermined notification trigger, notifying the first base station or the second base station of time difference information on the time difference measured by the measurement step.

Effect of the Present Invention

According to an embodiment of the present invention, there is provided a technique to enable a base station side to ascertain information of a time difference between a subframe of a first base station and a subframe of a second base station, in a mobile communication system including the first base station and the second base station that perform communication with a user apparatus by inter-base station carrier aggregation.

Also, according to an embodiment of the present invention, it becomes possible to properly configure a measurement gap even when there is a difference in subframe boundaries between the first base station and the second base station.

EMBODIMENTS FOR CARRYING OUT THE INVENTION

In the following, an embodiment of the present invention is described with reference to figures. The embodiment described below is merely an example, and the embodiment to which the present invention is applied is not limited to the embodiment below. For example, although it is assumed that the communication system of the present embodiment supports LTE, the present invention can be applied not only to LTE but also to other schemes. Also, in the specification and the claims, the term "LTE" is used to mean Rel-12 of 3GPP, or schemes after Rel-12 unless otherwise stated.

(Communication System Whole Configuration, Basic Operation)

Figure 5:
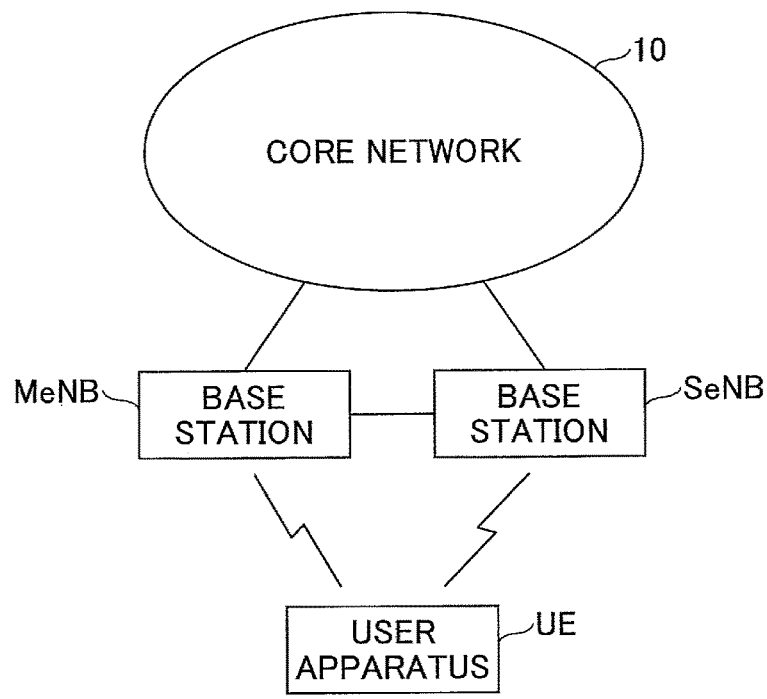
FIG. 5 is a diagram showing a configuration example of a communication system in an embodiment of the present invention.

FIG. 5 shows a configuration example of a mobile communication system in an embodiment of the present invention. As shown in FIG. 5, the mobile communication system of the present embodiment includes a base station MeNB and a base station SeNB each being connected to a core network 10, which enable performing Dual connectivity (DC) with a user apparatus UE. Communication is available between the base station MeNB and the base station SeNB by an X2 interface, for example.

Figure 6:
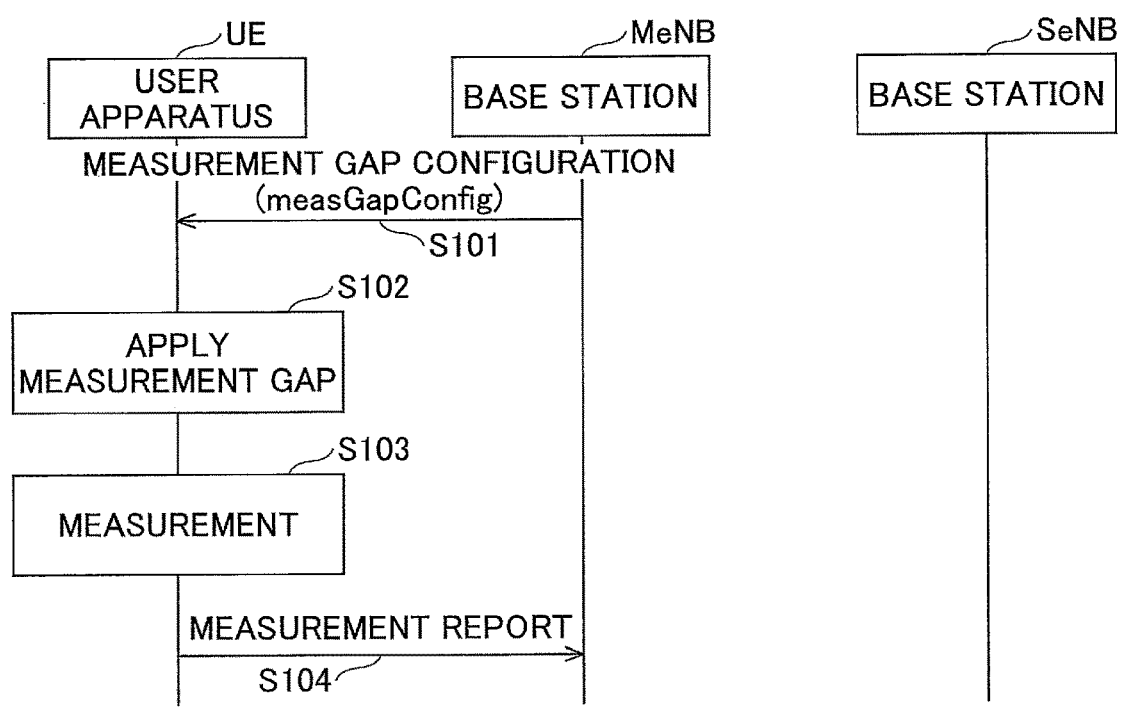
FIG. 6 is a diagram for explaining a basic operation example of a communication system in an embodiment of the present invention.

A basic operation in the present embodiment is described with reference to FIG. 6. In the present embodiment, the base station MeNB (it may be the base station SeNB) performs measurement gap configuration to the user apparatus UE (step 101). More specifically, the configuration is performed by an information element (measGapConfig) of Measurement Configuration in an RRCConnectionReconfiguration message. In the present embodiment, the time length of the measurement gap is 6 ms (6 subframes), and a period (gap pattern: 40 ms or 80 ms) and an offset (gapOffset) are specified by measGapConfig.

The user apparatus UE configured with the measurement gap applies the measurement gap according to the configuration (step 102). That is, the user apparatus UE performs operation of interrupting DL and UL transmission and reception during the measurement gap that starts a SFN/subframe number calculated from the period (MGRP) and the offset. The user apparatus UE performs measurement (step 103) and transmits a measurement report (step 104).

(About Difference Notification Method)

As described before, in order to align measurement gaps between the MCG and the SCG in the subframe level, it is necessary that the base station side ascertains the difference of the SFN/subframe number between the MCG and the SCG. In the present embodiment, the user apparatus UE notifies the base station side of the information of the difference. In the following, as the method, difference notification method examples 1-3 are described.

<Difference Notification Method Example 1>

First, the difference notification method example 1 is described. The difference notification method example 1 is to notify of a difference of time of subframes between the MCG and the SCG when configuring (adding) a base station SeNB (PSCell). That is, notification is triggered by configuration for performing inter-base station carrier aggregation.

Figure 7:
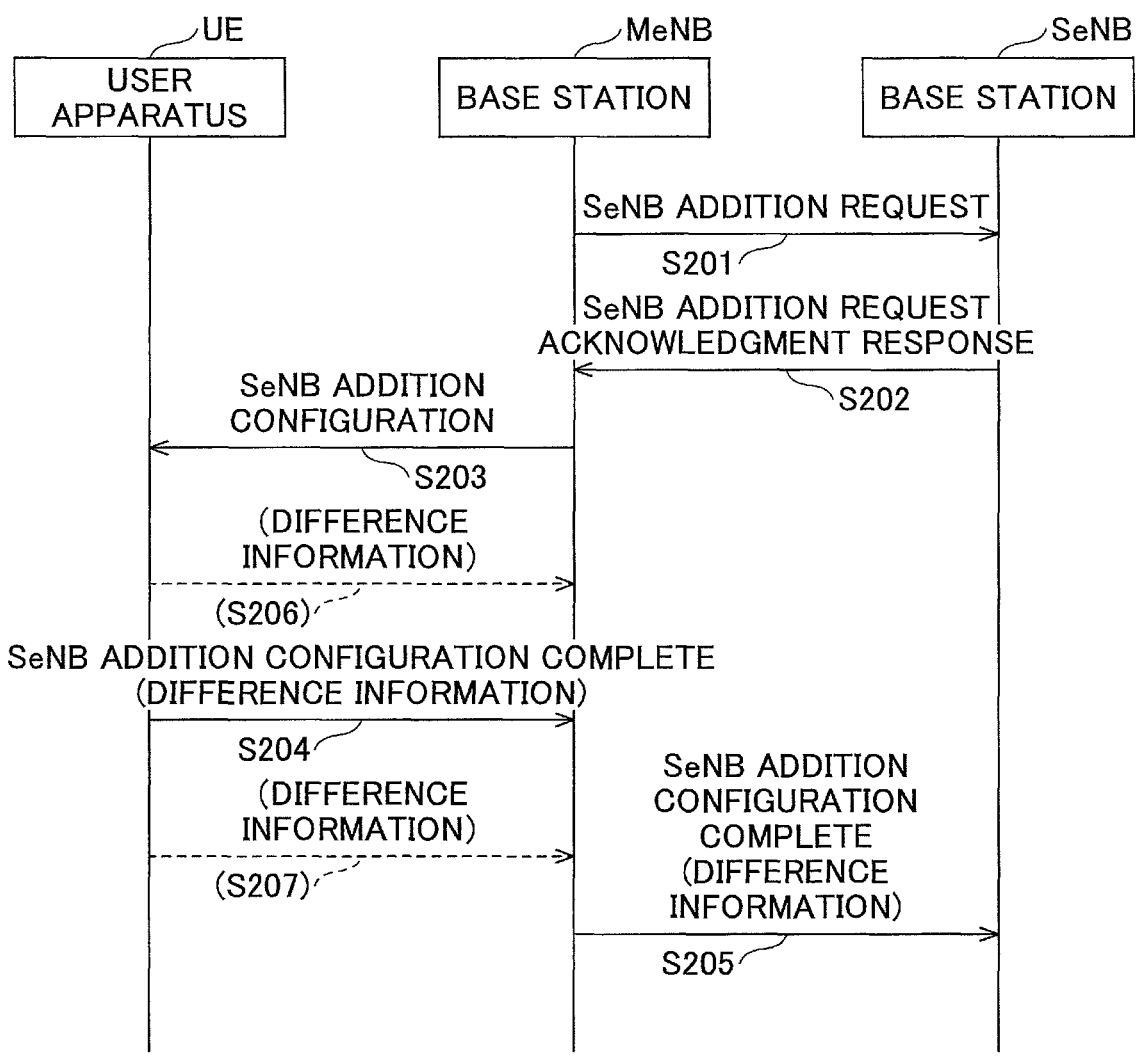
FIG. 7 is a diagram for explaining a difference notification method example 1.

An example of an operation sequence in the difference notification method example 1 is described with reference to FIG. 7. The sequence for configuring (adding) the PSCell (SeNB) is not limited to one shown in FIG. 7, and the one shown in FIG. 7 is merely an example. Also, FIG. 7 shows main signal flows. These points similarly apply to other sequence diagrams. Further, in the present embodiment, although it is assumed that RRC connection is performed between the MeNB and the user apparatus UE, RRC connection may be performed between the SeNB and the user apparatus UE.

As shown in FIG. 7, the base station MeNB transmits an SeNB addition request to a base station SeNB which is a base station that becomes an SeNB (step 201). The base station SeNB returns an SeNB addition request acknowledgement response to the base station MeNB (step 202). Then, the base station MeNB transmits an RRC signal (example: RRCConnectionReconfiguration) to the user apparatus UE to instruct SeNB addition configuration (step 203).

The user apparatus UE that receives the instruction adds an SeNB (PSCell) and starts communication with the base station SeNB. Also, the user apparatus UE measures a difference of subframes between the MCG and the SCG based on a signal (synchronization signal, broadcast signal and the like) received from the base station MeNB and a signal (synchronization signal, broadcast signal and the like) received from the base station SeNB to obtain difference information (time difference information). An example of difference information (time difference information) is described later.

After SeNB addition configuration, the user apparatus UE transmits an SeNB addition configuration complete message (example: RRCConnectionReconfigurationComplete) to the base station MeNB. In the example of FIG. 7, the user apparatus UE transmits the message by including the above-mentioned difference information (step 204). The message that includes the difference information is transmitted from the base station MeNB to the base station SeNB (step 205).

In the above mentioned example, although the difference information is included in the message of SeNB addition configuration complete, this is merely an example. For example, as indicated by step 206, the difference information may be transmitted before SeNB addition configuration complete transmission. Also, as indicated in step 207, the difference information may be transmitted after SeNB addition configuration complete transmission. In any case, the gap information is transmitted from the base station MeNB to the base station SeNB.

By the way, the notification of difference information based on trigger detection may be performed from the user apparatus UE to the base station SeNB, or may be performed from the user apparatus UE to both of the base station MeNB and the base station SeNB. Same applies to gap notification method examples 2 and 3 described below.

<Difference Notification Method Example 2>

Next, the difference notification method example 2 is described. The difference notification method example 2 is to notify of difference information at a timing (at a timing when Event A2 is triggered) for transmitting a measurement report of Event A2.

In the Event A2, when reception power/reception quality of a serving cell (the frequency of which is specified by measurement configuration) deteriorates below a predetermined threshold, the user apparatus UE notifies the base station eNB of a measurement report on the cell.

When the Event A2 is triggered so that a measurement report is transmitted, it is assumed that the base station MeNB configures a measurement gap in order to cause the user apparatus UE to measure radio quality of a different frequency. Thus, in the difference notification method example 2, the difference information is notified at the timing when the Event A2 is triggered. Event A2 is an example, and difference information may be notified being triggered by occurrence of other events by which a measurement gap is assumed to be configured.

An example of an operation sequence in the difference notification method example 2 is described with reference to FIG. 8. The base station MeNB transmits a message of measurement configuration to the user apparatus UE (step 301). The measurement configuration includes information for specifying the Event A2 as a report trigger. The user apparatus UE performs measurement of a predetermined frequency to detect occurrence (reception quality and the like deteriorated below a threshold) of a trigger of the Event A2 (step 302).

Being triggered by the detection or irrespective of the detection, the user apparatus UE measures a difference of subframes between the MCG and the SCG based on a signal (synchronization signal, broadcast signal and the like) received from the base station MeNB and a signal (synchronization signal, broadcast signal and the like) received from the base station SeNB, and obtains difference information. Then, the user apparatus UE transmits a measurement report of the Event A2 by including difference information (step 303). The difference information is notified from the base station MeNB to the base station SeNB (step 304).

Figure 8:
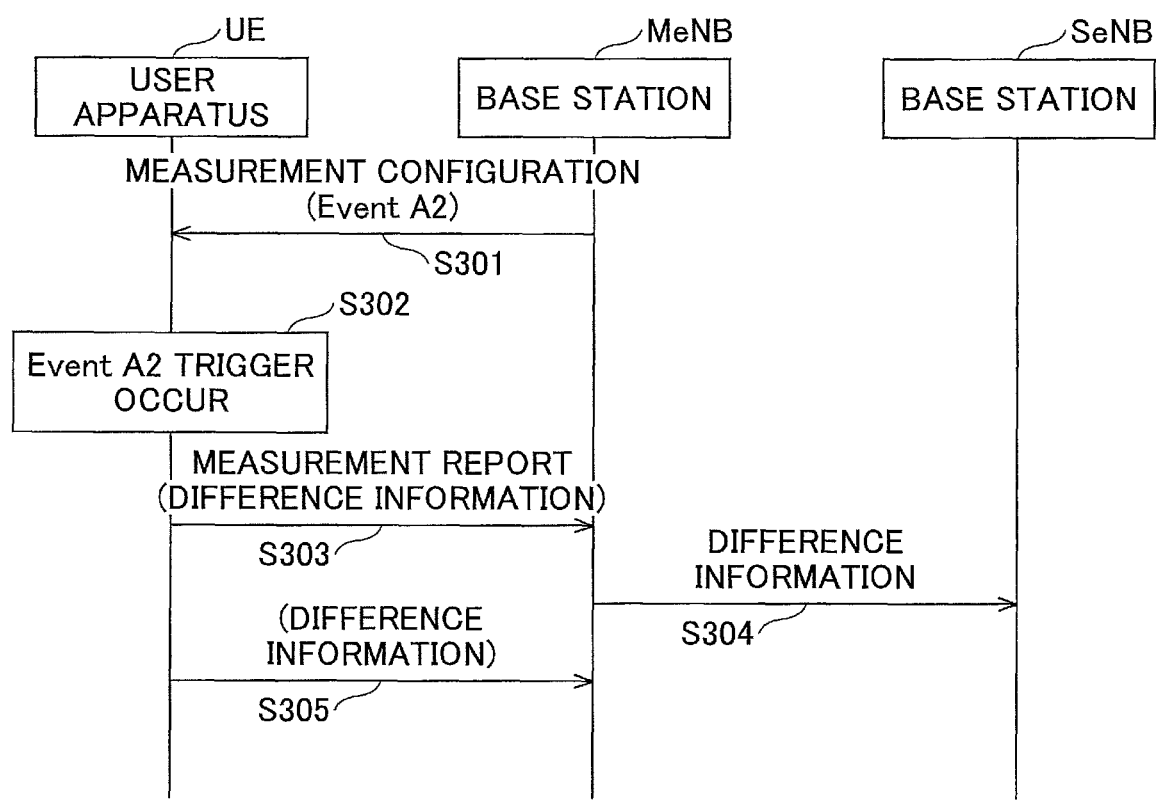
FIG. 8 is a diagram for explaining a difference notification method example 2.

Instead of transmitting the measurement report by including the difference information, or, in addition to that, the difference information may be transmitted by a different signal after transmitting the measurement report as indicated in step 305 of FIG. 8. Also in this case, the difference information is notified from the base station MeNB to the base station SeNB. When reporting by the different signal, an UL data amount reporting may not be triggered for the data. That is, RegularBSR may not be triggered. Alternatively, Scheduling request transmission may not be triggered. In this case, transmission is performed by an UL grant assigned from the base station MeNB or SeNB due to another UL data occurrence.

In the difference notification method example 2, since the user apparatus UE notifies of difference information only when there is a possibility that a measurement gap is configured, unnecessary UL control signal can be reduced.

<Difference Notification Method Example 3>

Next, a difference notification method example 3 is described. The difference notification method example 3 is to notify of difference information when the user apparatus UE receives an RRC signal (example: RRCConnectionReconfiguration), from the base station MeNB, for configuring a measurement gap. Notification of difference information may be performed only when the RRC signal includes an information element (example: measGapConfig) for configuring a measurement gap. In the sequence example described below, it is assumed that an information element for configuring a measurement gap is included.

When SFNs/subframe numbers of the base station MeNB (MCG) and the base station SeNB (SCG) are synchronized (when the difference is equal to or less than a predetermined threshold (when it can be regarded that there is no gap)), it is not necessary to report a difference. Therefore, the user apparatus UE may notify of the difference information only when detecting that they are asynchronous (that there is a difference). According to such an operation, it is possible that the NW side (base station MeNB, more specifically) can implicitly ascertain that there is no difference when there is no report.

In the difference notification method example 3, since the difference information can be notified when a measurement gap is actually configured, compared to the gap notification method example 2, unnecessary UL control signals can be reduced more.

Figure 9:
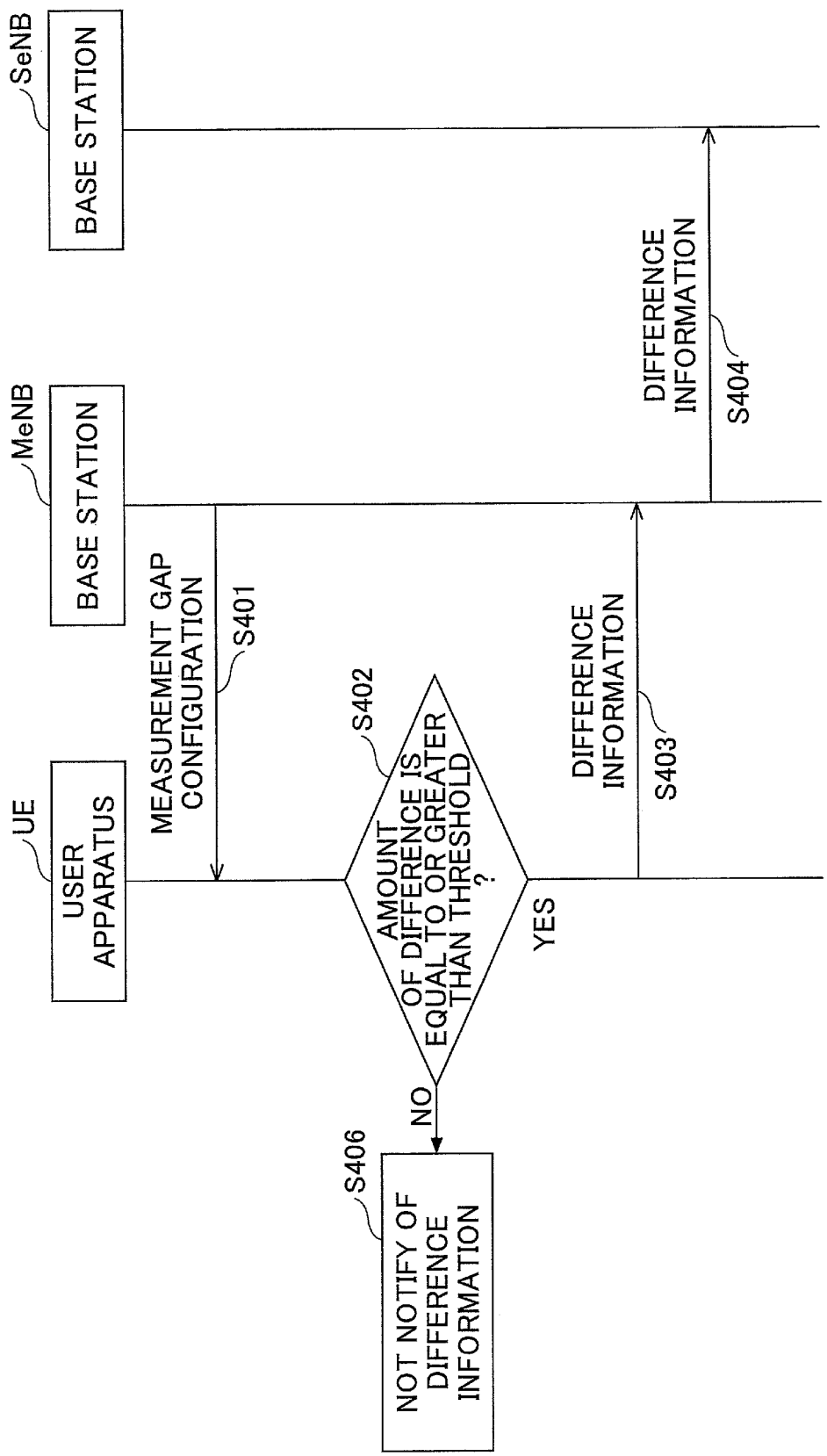
FIG. 9 is a diagram for explaining a difference notification method example 3.

An example of an operation sequence in the difference notification method example 3 is described with reference to FIG. 9. The base station MeNB transmits an RRC signal for performing measurement gap configuration to the user apparatus UE (step 401).

The user apparatus UE measures a difference of subframes between the MCG and the SCG to obtain difference information as described so far.

The user apparatus UE that receives the instruction of measurement gap configuration determines to transmit difference information when there is a difference, and first, the user apparatus UE determines whether the amount of the difference is equal to or greater than a predetermined threshold (step 402). When the determination result of step 402 is No, notification of difference information is not performed (step 406).

When the determination result of step 402 is Yes, the user apparatus UE notifies the base station MeNB of difference information (step 403). The difference information is transmitted from the base station MeNB to the base station SeNB (step 404).

The difference information in step 403 may be notified by including it in a complete message (example: RRCConnectionReconfigurationComplete) for the RRC signal for configuring a measurement gap.

(Example of Difference Information)

The difference information that the user apparatus UE transmits to the base station MeNB may be any information as long as a difference amount can be ascertained in the base station MeNB or the SeNB side by the information. However, for example, information described with reference to FIGS. 10A, 10B and 11 can be used.

Figure 10A:
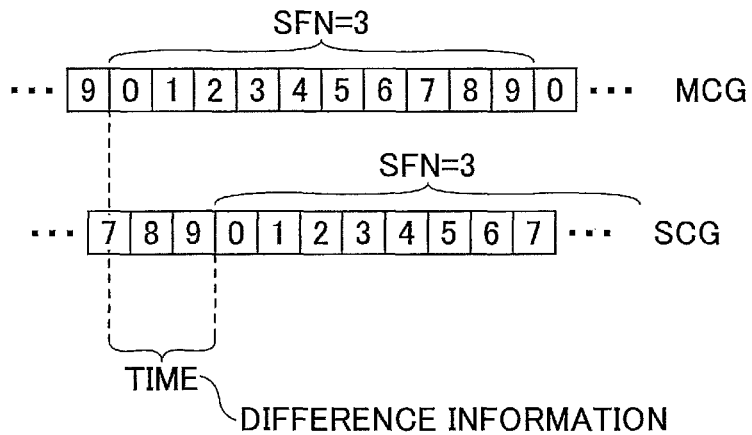
FIG. 10A is a diagram for explaining a difference information example 1.
Figure 10B:
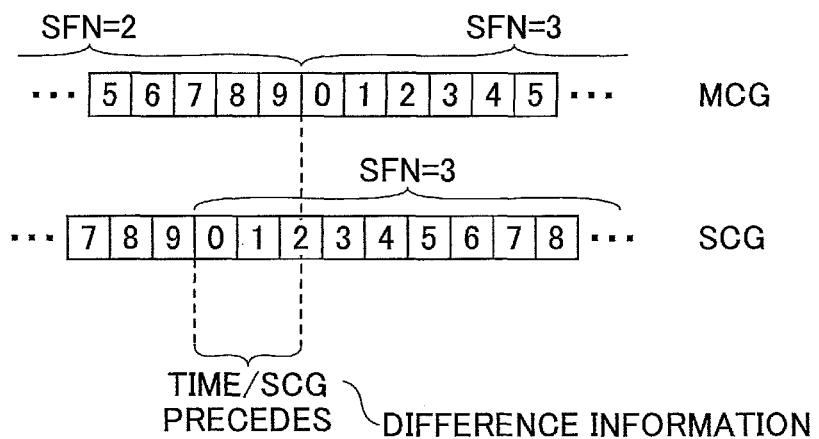
FIG. 10B is a diagram for explaining a difference information example 1.

FIGS. 10A and 10B are diagrams for explaining a difference information example 1. The difference information example 1 is time information indicating an amount by which the subframes are deviated between the MCG and the SCG. That is, difference information is determined as time difference information indicating a difference between a time of SFN/subframe (example: SFN=3, subframe 0) of a time position in the MCG (on the premise that CCs in the MCG are synchronized, same applies to SCG) and a time of the SFN/subframe (example: SFN=3, subframe 0) in the SCG. The time difference information may be time or a number of subframes, or other information. SFN and subframe number of each base station can be ascertained from broadcast information broadcasted from each base station, for example.

The example of FIG. 10A is to measure a time difference between a subframe of the base station MeNB (MCG) and a corresponding subframe, of the base station SeNB (SCG), located after the start edge of the subframe of the MeNB (MCG), and to notify of it as difference information. In the example of FIG. 10A, it can be found that the MCG advances by the time difference compared to the SCG.

The example of FIG. 10B is to measure a time difference between a subframe edge (start edge of SFN=3/subframe 0 in the example of FIG. 10B) of the base station MeNB (MCG) and a corresponding subframe edge, of the base station SeNB, that is the closest to the subframe edge of the base station MeNB (MCG), and to report the time difference and information indicating which subframe relatively advances.

In the present embodiment, in a case where the base station MeNB configures the user apparatus UE with a measurement gap, the base station SeNB receives, from the base station MeNB, measurement gap configuration information (gap pattern, gap offset and the like) to be configured in the user apparatus UE, and holds the measurement gap configuration information.

Then, the base station SeNB calculates a SFN and a subframe number which become a start point of a measurement gap (period during which DL/UL scheduling is not performed) in which the difference is not considered, based on the gap pattern and the gap offset, from a predetermined calculation equation, and further, applies the difference information (time difference) to the calculated measurement gap to calculate a measurement gap (period during which DL/UL scheduling is not performed) in which the difference is considered. To apply difference information (time difference) to a measurement gap is to make the measurement gap of the MCG and the measurement gap of the SCG be aligned as much as possible.

In the example of FIG. 10A, when a measurement gap (one gap which comes periodically) of the MCG is SFN=3/subframe=0~5, a measurement gap is set to be from subframe 8 of SFN=2 to subframe 3 of SFN=3 in the SCG. However, as described with reference to FIG. 4B, a difference between subframe boundaries remains. Methods to handle the difference between subframe boundaries are described later.

The adjustment of a difference in the SCG side is similarly performed in the user apparatus UE. That is, in the example of FIG. 10A, for example, when the user apparatus UE calculates a measurement gap of the MCG as subframes=0~5 of SFN=3, the user apparatus UE determines subframes from subframe 8 of SFN=2 to subframe 3 of SFN=3 as a measurement gap in the SCG side.

Figure 11:
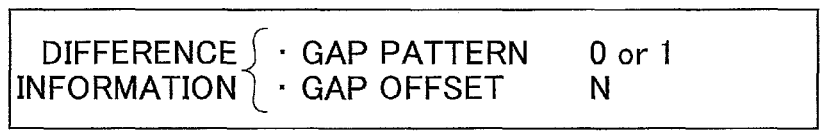
FIG. 11 is a diagram for explaining a difference information example 2.

FIG. 11 is a diagram for explaining a difference information example 2. In the difference information example 2, the user apparatus UE calculates a gap pattern and a gap offset in the SCG such that the MCG and the SCG are aligned in consideration of a difference of subframes between the MCG and the SCG, and notifies of them.

The base station SeNB that receives the difference information (gap pattern and gap offset) via the base station MeNB calculates a measurement gap using the gap pattern and the gap offset, so that a measurement gap is calculated such that the MCG and the SCG are aligned. For example, in the example of FIG. 10A, when SFN=3/subframes 0~5 is a measurement gap (one gap which arrives periodically), the SCG calculates a measurement gap using the difference information (gap pattern and gap offset) so that subframes from a subframe 8 of SFN=2 to a subframe 3 of SFN=3 can be calculated as the measurement gap. However, as mentioned above, a difference between subframe boundaries remains.

The user apparatus UE similarly calculates a measurement gap of the SCG from the gap pattern and the gap offset in the SCG.

By calculating difference information like the difference information example 2 and by notifying the base station SeNB of it, NW implementation simplification and X2 signal reduction become possible without necessity of information exchange of measurement gap configuration information (MG config) between the MeNB and the SeNB. The user apparatus UE may notify the SeNB of configuration information (gap pattern and gap offset) received from the base station MeNB without correction. In this case, the base station SeNB can calculate a measurement gap aligned with the MCG side based on difference information that is obtained separately.

(Method for Handling the Difference Between Subframe Boundaries)

Figure 1:
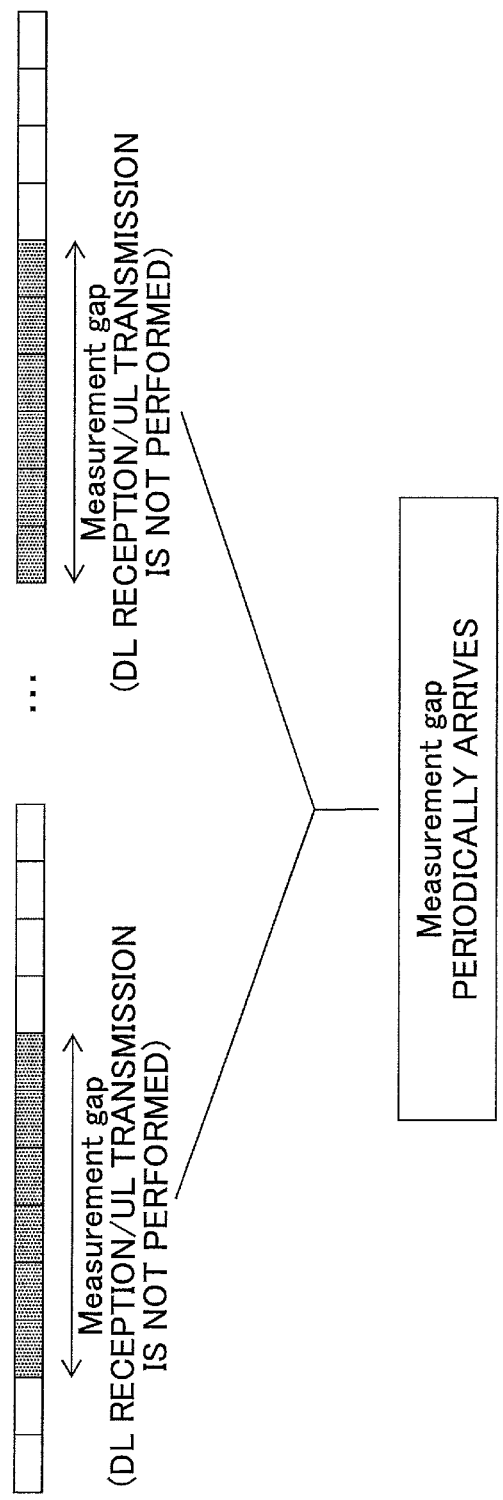
FIG. 1 is a diagram for explaining a measurement gap.
Figure 2:
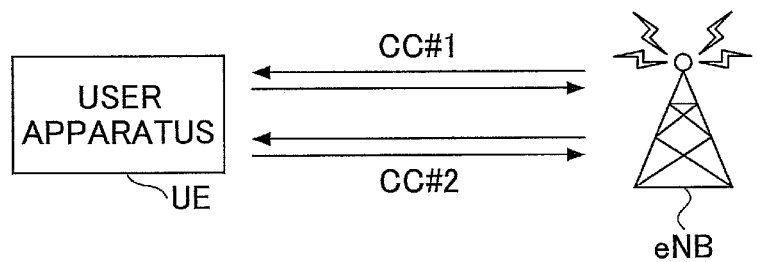
FIG. 2 is a diagram showing CA up to Rel-11.
Figure 3:
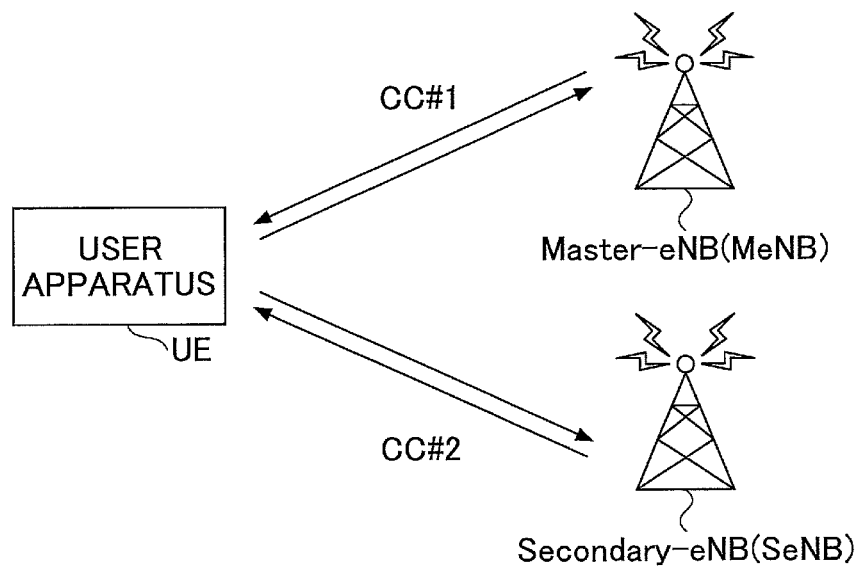
FIG. 3 is a diagram showing an example of Dual Connectivity.
Figure 4A:
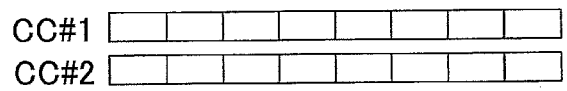
FIG. 4A is a diagram for explaining a problem in Dual Connectivity.
Figure 4B:
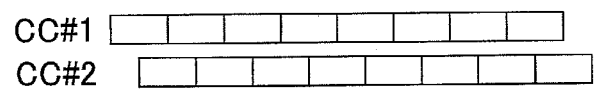
FIG. 4B is a diagram for explaining a problem in Dual Connectivity.

As shown in FIG. 4B, when there is a difference in subframe boundaries between the MCG and the SCG, even though adjustment is performed for aligning SFN/subframe as mentioned above, there occurs a part where measurement gaps do not overlap between the MeNB and the SeNB by a difference between subframe boundaries. Therefore, there is a possibility in that DL reception/UL transmission and the like are unnecessarily performed, so that there is a possibility in that system throughput deteriorates due to resource usage efficiency deterioration and UL interference.

Figure 12:
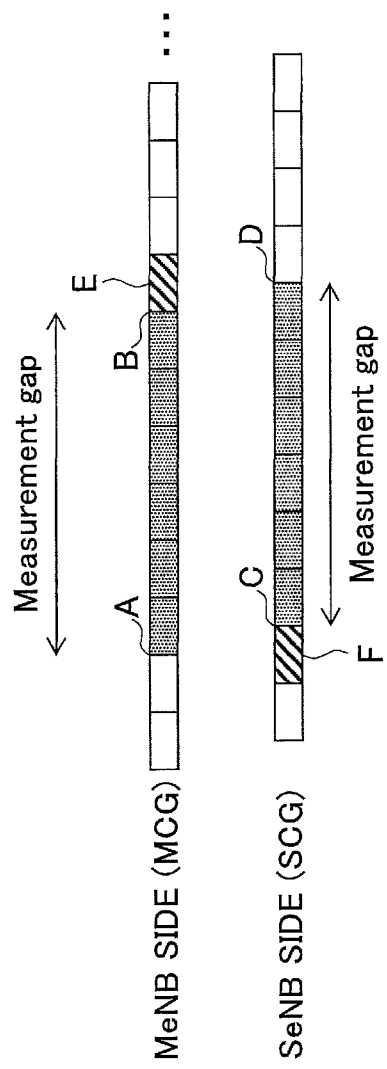
FIG. 12 is a diagram for explaining a situation where there is a difference in subframe boundaries between MCG and SCG.

FIG. 12 shows a situation in a case where there is a difference of subframe boundaries between the MCG and the SCG. As shown in FIG. 12, each of a period of A~B in the MCG and a period of C~D in the SCG is a period calculated as a measurement gap based on configuration information (and difference information). In the example of FIG. 12, there is a difference of about half of 1 subframe between the measurement gap in the MCG and the measurement gap in the SCG.

At this time, the subframe indicated by E in the MeNB (MCG) side is not a measurement gap for the MCG, but is a timing of a measurement gap for the SCG. Thus, the user apparatus UE is not allowed to perform transmission and reception also for the MCG in the subframe indicated by E. Also, the base station MeNB is not allowed to perform UL/DL scheduling in the subframe of E.

Similarly, the subframe indicated by F in the SeNB (SCG) side is not a measurement gap for the SCG, but is a timing of a measurement gap for the MCG. Thus, the user apparatus UE is not allowed to perform transmission and reception also for the SCG in the subframe indicated by F. Also, the base station SeNB is not allowed to perform UL/DL scheduling in the subframe of F. By the way, in the present embodiment, each of a scheduling unit and a transmission/reception unavailability unit is a subframe unit.

That is, when there is a difference between subframe boundaries, there occurs a period during which transmission and reception are unavailable and scheduling is unavailable even though the period is not a timing of the calculated measurement gap.

By the way, if a measurement gap can be configured independently for the MeNB and for the SeNB, the situation shown in FIG. 12 does not become a proble. However, actually, it is difficult to configure a measurement gap independently for the MeNB and for the SeNB in terms of UE implementation. Therefore, in the present embodiment, it is presupposed to configure a measurement gap common to the MeNB and the SeNB.

The present embodiment, as described below, handles a case where there is a difference between subframe boundaries. In the following, a handling method example 1 and a handling method example 2 are described. By handling it in these ways, a measurement gap common to the MeNB and the SeNB can be properly configured so that UE implementation can be simplified.

<Handling Method Example 1 in a Case where there is a Difference Between Subframe Boundaries>

In the handling method example 1 in a case where there is a difference between subframe boundaries, the user apparatus UE does not perform transmission and reception in a predetermined period (example: 1 subframe, 1 ms) before and after the measurement gap for both of the MCG and the SCG. Also, the base station MeNB/SeNB does not perform DL/UL scheduling before and after the measurement gap in CCs (CG) under the base station MeNB/SeNB.

That is, the user apparatus UE regards, in each of measurement gaps of the MCG and the SCG, a timing before and after the calculated measurement gap to be a transmission reception unavailable timing (additional part of the measurement gap). Also, each of the base station MeNB and SeNB regards a timing before and after the measurement gap calculated by the base station itself to be a DL/UL scheduling unavailable timing (additional part of the measurement gap).

Figure 13:
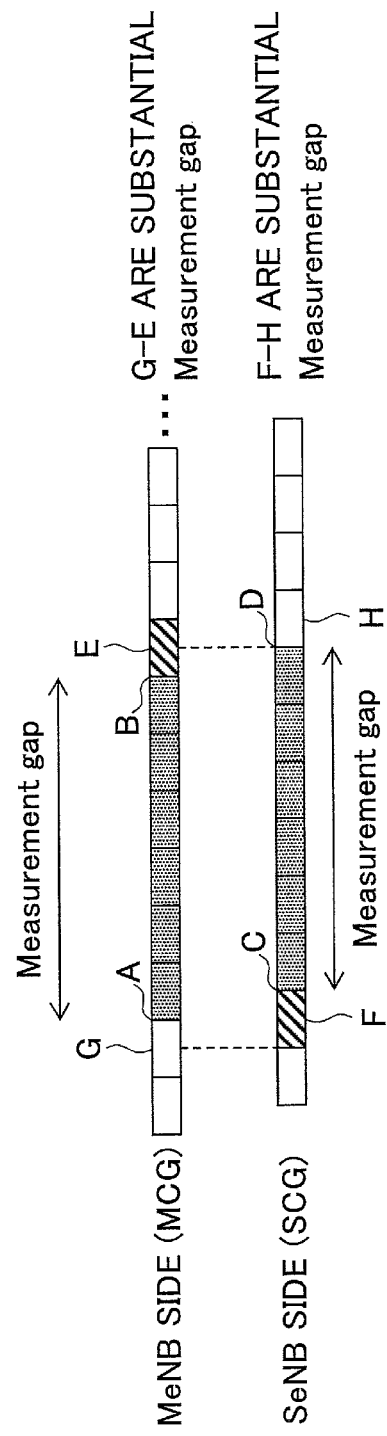
FIG. 13 is a diagram for explaining a handling method example 1 when there is a difference in subframe boundaries.

FIG. 13 shows the handling method 1 in a situation the same as that of FIG. 12. As shown in FIG. 13, in the MeNB (MCG) side, in subframes of G and E which are before and after the measurement gap, the user apparatus UE is not allowed to perform transmission and reception, and the base station MeNB is not allowed to perform DL/UL scheduling. That is, G~E is regarded as a measurement gap. Also, in the SeNB (SCG) side, in subframes of F and H which are before and after the measurement gap, the user apparatus UE is not allowed to perform transmission and reception, and the base station SeNB is not allowed to perform DL/UL scheduling. That is, F~H is regarded as a measurement gap.

However, a function may be provided for determining that transmission and reception are available even in the predetermined period when a difference of subframe boundaries between the MCG and the SCG is sufficiently small (example: when it is equal to or less than a predetermined threshold). That is, the above-mentioned predetermined period may not be provided.

As to determination of the size of the difference between subframe boundaries, the user apparatus UE can use difference information measured by the user apparatus UE, and the base station MeNB/SeNB can use difference information notified from the user apparatus UE. Also, the base station MeNB/SeNB may ascertain a difference of SFN/subframe and a difference of subframe boundaries, by exchanging information between the base station MeNB and the base station SeNB, without receiving notification of difference information from the user apparatus UE, so as to perform calculation of a measurement gap in consideration of the difference and to perform size determination of a difference.

Figure 14:
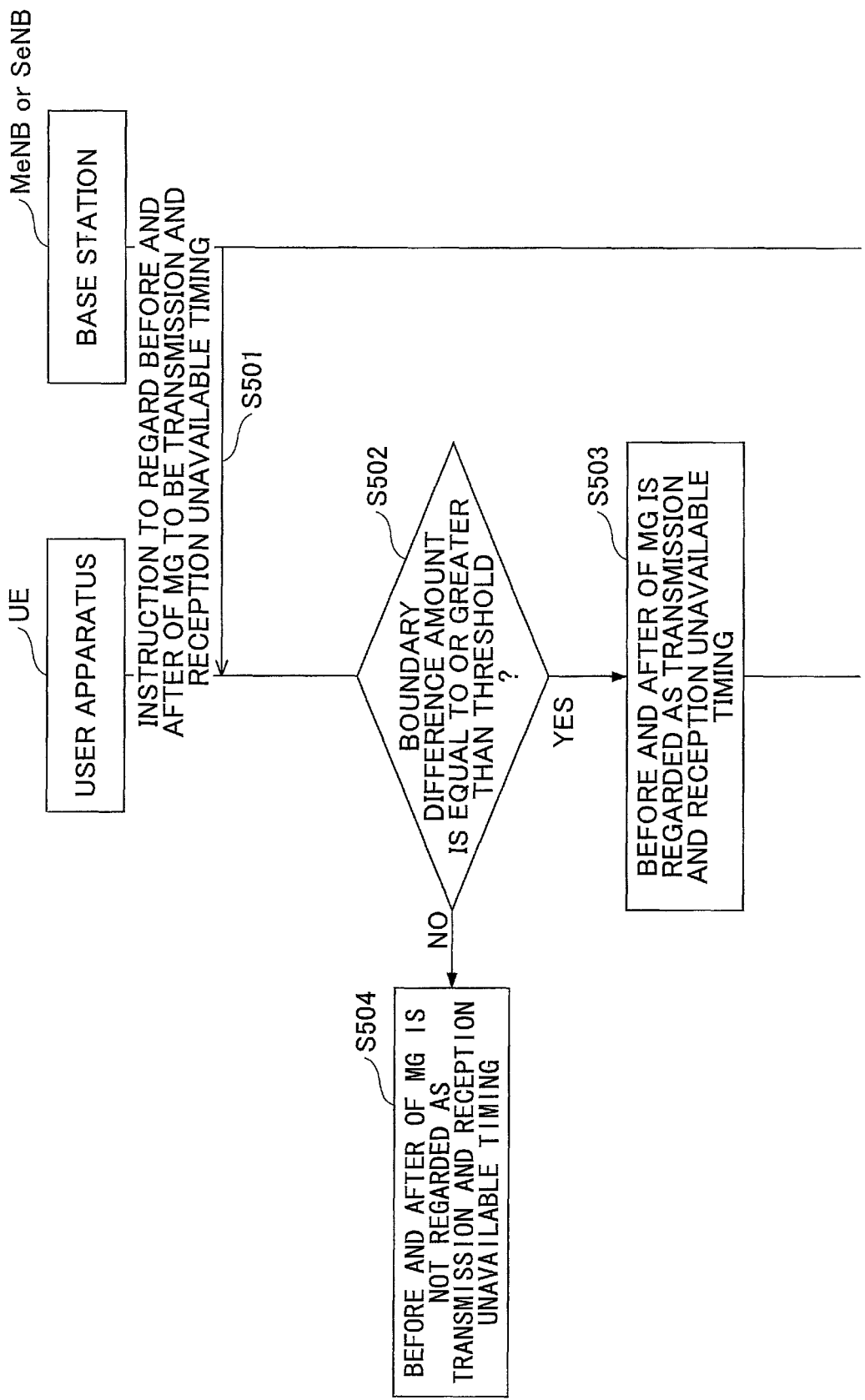
FIG. 14 is a diagram for explaining a handling method example 1 when there is a difference in subframe boundaries.

An example of an operation sequence of the handling method example 1 is described with reference to FIG. 14. In this example, the base station (MeNB or SeNB) transmits an instruction, to the user apparatus UE, to regard a timing before and after a measurement gap as transmission/reception unavailable timing (step 501). This instruction may be performed only when the boundary difference is equal to or greater than a predetermined threshold in the base station (MeNB or SeNB). When there is not this instruction, it is not necessary to perform the following processing. The instruction may be defined as new gap configuration information, or may be a new RRC signal, MAC signal or PHY signal.

The user apparatus UE determines whether a difference amount of subframe boundaries between the MCG and the SCG is equal to or greater than a threshold (step 502). When the determination result of step 502 is Yes (the difference is equal to or greater than threshold), before and after of the measurement gap (MG) is regarded as transmission/reception unavailable timing in each of the MCG and the SCG (regarded as a measurement gap) (step 503). When the determination result of step 502 is No (the difference is less than the threshold), a measurement gap calculated from configuration information and the like is used without regarding the timing before and after the measurement gap (MG) as the transmission/reception unavailable timing (step 504).

<Handling Method Example 2 in a Case where there is a Difference Between Subframe Boundaries>

In the handling method example 2, each of the user apparatus UE and the base station SeNB performs timing calculation of a measurement gap based on a TimeStamp (absolute time) instead of performing timing calculation of the measurement gap using a gap pattern and a gap offset.

An operation example of the user apparatus UE is described with reference to an example shown in FIG. 15. First, the user apparatus UE calculates a measurement gap using a measurement gap configuration (gap pattern and gap offset) from the base station MeNB (or the base station SeNB) to obtain a measurement gap in the MCG side shown in FIG. 15.

The user apparatus UE obtains a time T of the head of the measurement gap of the MCG side to ascertain that, for example, the time T is a subframe 2 of SFN=3 in the SCG side, and to determine a measurement gap as 7 subframes (7 ms) having the subframe 2 as a head. In the 7 subframes, the head subframe includes a head edge of a head subframe of the MCG side, and the last subframe incudes the last edge of a last subframe in the MCG side. That is, subframes of the SCG side that overlap with subframes in the MCG side that become a measurement gap in the MCG side are configured as a measurement gap for the SCG. In the example of FIG. 15, the 6 subframes in the MCG side that become a measurement gap for the MCG overlap with subframes that become a measurement gap for the SCG in the time domain. More specifically, in the example of FIG. 15, the 6 subframes in the MCG side that become a measurement gap for the MCG are included in 7 subframes that become a measurement gap for the SCG in the time domain.

As described with reference to FIG. 7-FIG. 10 and the like, the base station SeNB obtains difference information (time difference) between the MCG and the SCG to perform processing similar to that performed by the user apparatus UE using the difference information. That is, in the example of FIG. 15, the base station SeNB has measurement gap configuration information, and calculates SFN/subframe number that become a measurement gap (corresponding to a measurement gap of the MCG in FIG. 15). Then, the base station SeNB obtains a time T of the head of the measurement gap in the MCG side using the difference information, and ascertains, for example, that the time T is a subframes 2 of SFN=3 in the SCG side to determine 7 subframes (7 ms) having the subframe 2 as the head to be a measurement gap (a period during which UL/DL scheduling is not performed).

Figure 15:
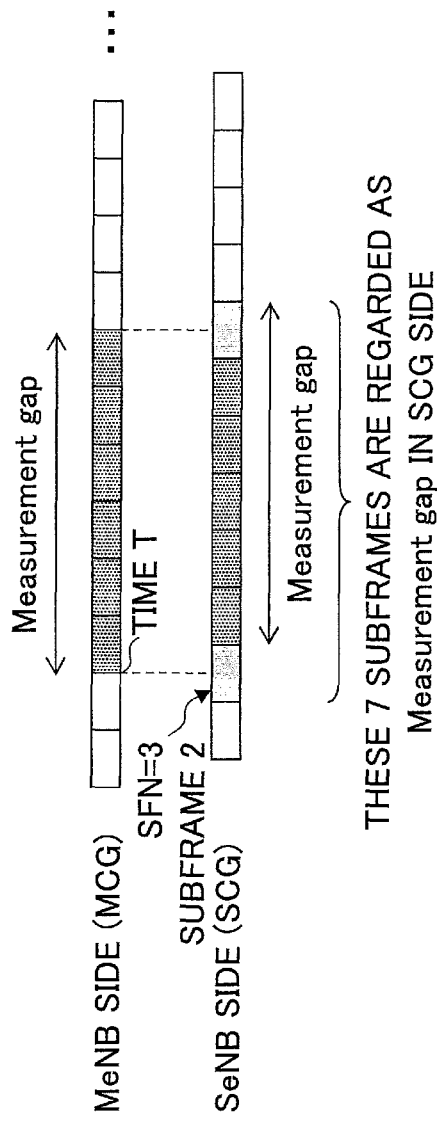
FIG. 15 is a diagram for explaining a handling method example 2 when there is a difference in subframe boundaries.

According to the handling method example 2, as shown in FIG. 15, the MCG is not affected by the measurement gap of the SCG. Thus, a period during which scheduling cannot be performed is only 6 ms, in which there is no additional transmission reception unavailable period/scheduling unavailable period. That is, since the measurement gap of the MCG side is not affected from the SCG side, the scheduling unavailable period does not increase compared to the existing LTE (6 ms), so that throughput deterioration can be avoided. On the other hand, in the SCG, although the period of the measurement gap becomes greater than that of the MCG side by 1 subframe, transmission reception unavailable period/scheduling unavailable period is less than that of the handling method example 1.

When a difference of subframe boundaries between the MCG and the SCG is sufficiently small (when it is equal to or less than a predetermined threshold, for example), transmission reception unavailable period/scheduling unavailable period in the SCG may not be provided. Also, in this case, subframes that overlap with subframes that become a measurement gap for the MCG are configured as a measurement gap for the SCG.

As to determination of the size of the difference between subframe boundaries, the user apparatus UE can use difference information measured by the user apparatus UE, and the base station MeNB/SeNB can use difference information notified from the user apparatus UE. Also, the base station MeNB/SeNB may ascertain a difference of SFN/subframe and a difference of subframe boundaries, by exchanging information between the base station MeNB and the base station SeNB, without receiving notification of difference information from the user apparatus UE, so as to perform calculation of a measurement gap in consideration of the difference and to perform size determination of a difference.

As described above, according to the handling method examples 1 and 2, even when there is a difference of subframe boundaries between the MCG and the SCG, a measurement gap can be properly configured.

(Apparatus Configuration, Operation Flow)

<User Apparatus UE>

Figure 16:
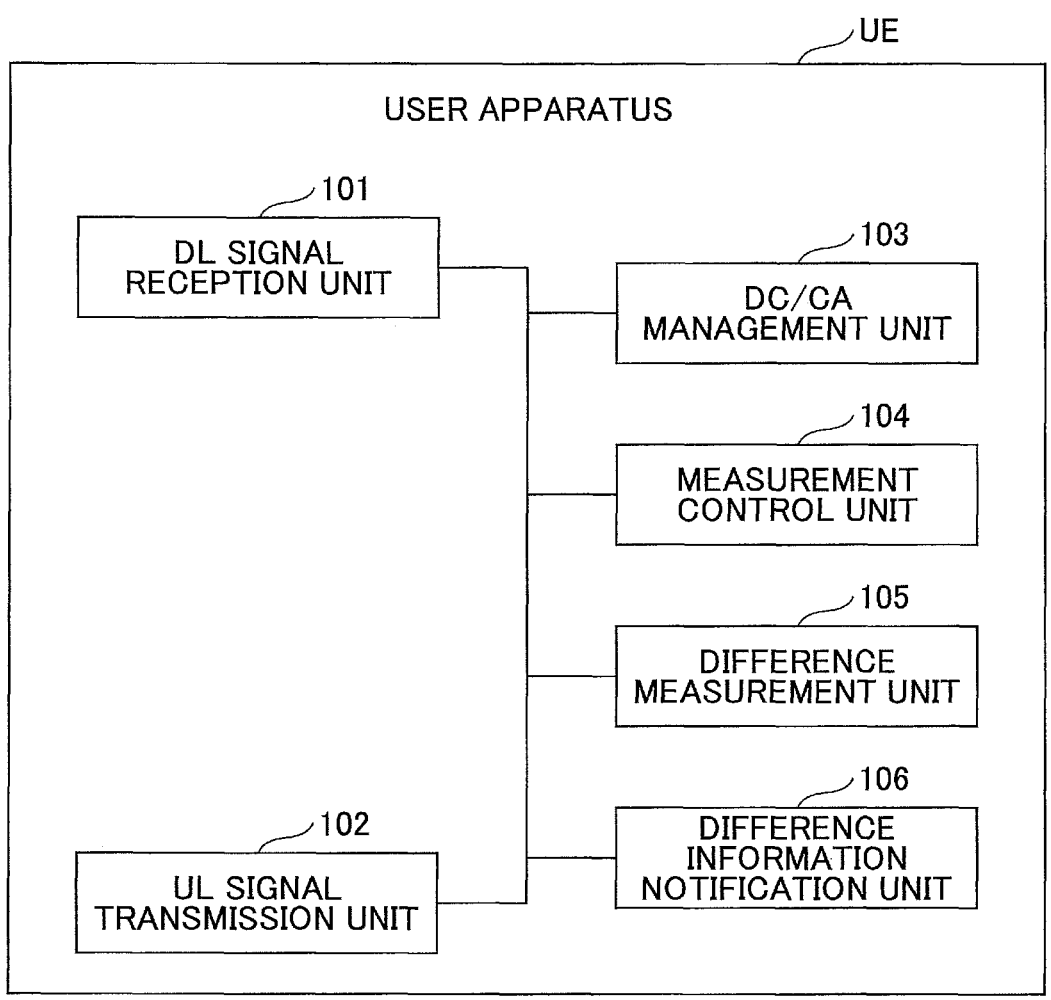
FIG. 16 is a diagram showing a configuration example of a user apparatus UE in an embodiment of the present invention.

FIG. 16 shows a configuration example of the user apparatus UE that performs operation described so far. FIG. 16 only shows functional units especially related to the embodiment of the present invention in the user apparatus UE, and the user apparatus UE also includes at least functions, not shown in the figure, for performing operation complying with LTE.

As shown in FIG. 16, the user apparatus UE in the present embodiment includes a DL signal reception unit 101, an UL signal transmission unit 102, a DC/CA management unit 103, a measurement control unit 104 and a difference measurement unit 105, and a difference information notification unit 106.

The DL signal reception unit 101 receives a radio signal from a base station (MeNB, SeNB), and extracts information from the radio signal. The UL signal transmission unit 102 generates a radio signal from transmission information, and transmits the radio signal to a base station (MeNB, SeNB). The DC/CA management unit 103 performs management (holding identification and state of configured CCs, and the like), addition, deletion, activation, deactivation and the like of each cell (CC) that forms DC.

The measurement control unit 104 performs quality measurement of a predetermined frequency, comparison with a threshold, measurement reporting trigger detection and the like based on measurement configuration information (example: instruction of Event A2) received from the base station MeNB (it may be an SeNB). Also, the measurement control unit 104 calculates a measurement gap (SFN/subframe that becomes the measurement gap) based on configuration information (gap pattern, gap offset and the like) of the measurement gap (MG), and performs control of inhibiting transmission and reception during a period of the measurement gap for the MCG. Also, the measurement control unit 104 corrects the calculated measurement gap based on difference information and the like measured by the difference measurement unit 105, and performs control of inhibiting transmission and reception in the corrected measurement gap for the SCG. Also, the measurement control unit 104 performs before-mentioned handling of the difference between subframe boundaries. For example, the measurement control unit 104 configures a measurement gap for the MCG based on configuration information, and configures subframes in the SCG side overlapping with subframes in the MCG side that become the measurement gap for the MCG as a measurement gap for the SCG. For example, the measurement control unit 104 configures a measurement gap for the MCG based on configuration information, and configures a measurement gap longer than the measurement gap for the MCG by 1 subframe as a measurement gap for the SCG.

The difference measurement unit 105 measures a difference of timing between the MCG and the SCG based on a signal received from the base station MeNB and a signal received from the base station SeNB to calculate (obtain) difference information described with reference to FIG. 10 and FIG. 11, for example. The difference information notification unit 106 notifies the base station (MeNB, SeNB) of difference information based on a predetermined trigger as described with reference to FIG. 7-FIG. 9 and the like.

Although the user apparatus UE can perform all operations of the user apparatus UE described so far, some operation examples are described in the following.

Figure 17:
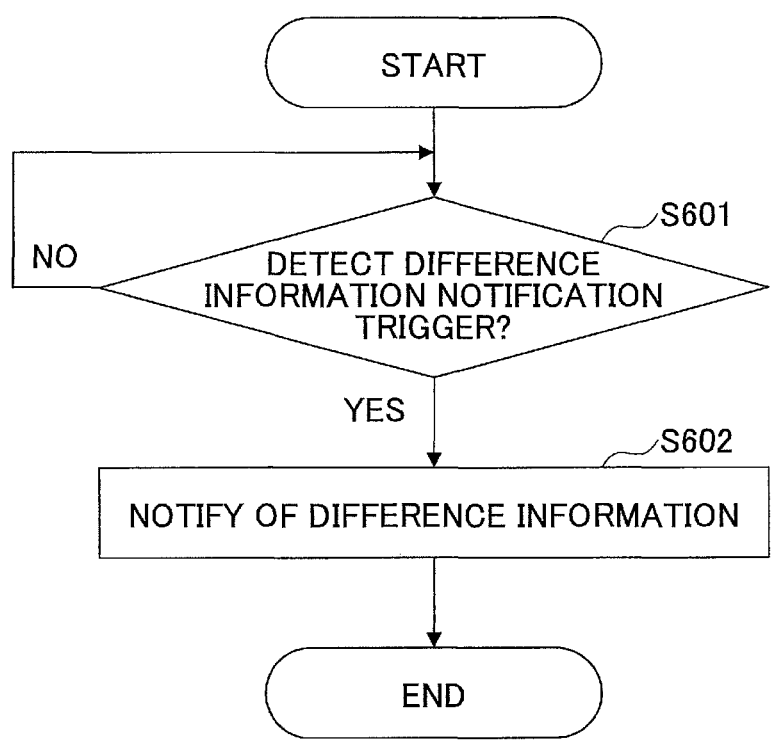
FIG. 17 is a flowchart showing an operation example of a user apparatus UE.

FIG. 17 shows a flowchart of an operation example on difference information notification in the user apparatus UE. In FIG. 17, the difference measurement unit 105 of the user apparatus UE measures a difference of subframes between the MCG and the SCG periodically, for example, so that difference information notification is available according to occurrence of a trigger. Alternatively, measurement may be performed according to trigger occurrence, and difference information may be obtained.

In step 601 of FIG. 17, the difference information notification unit 106 determines whether a trigger of difference information notification is detected. When a trigger is detected (example: reception of a signal of MG configuration), the difference information notification unit 106 notifies, for example, the base station MeNB of difference information via the UL signal transmission unit 102 (step 602).

Figure 18:
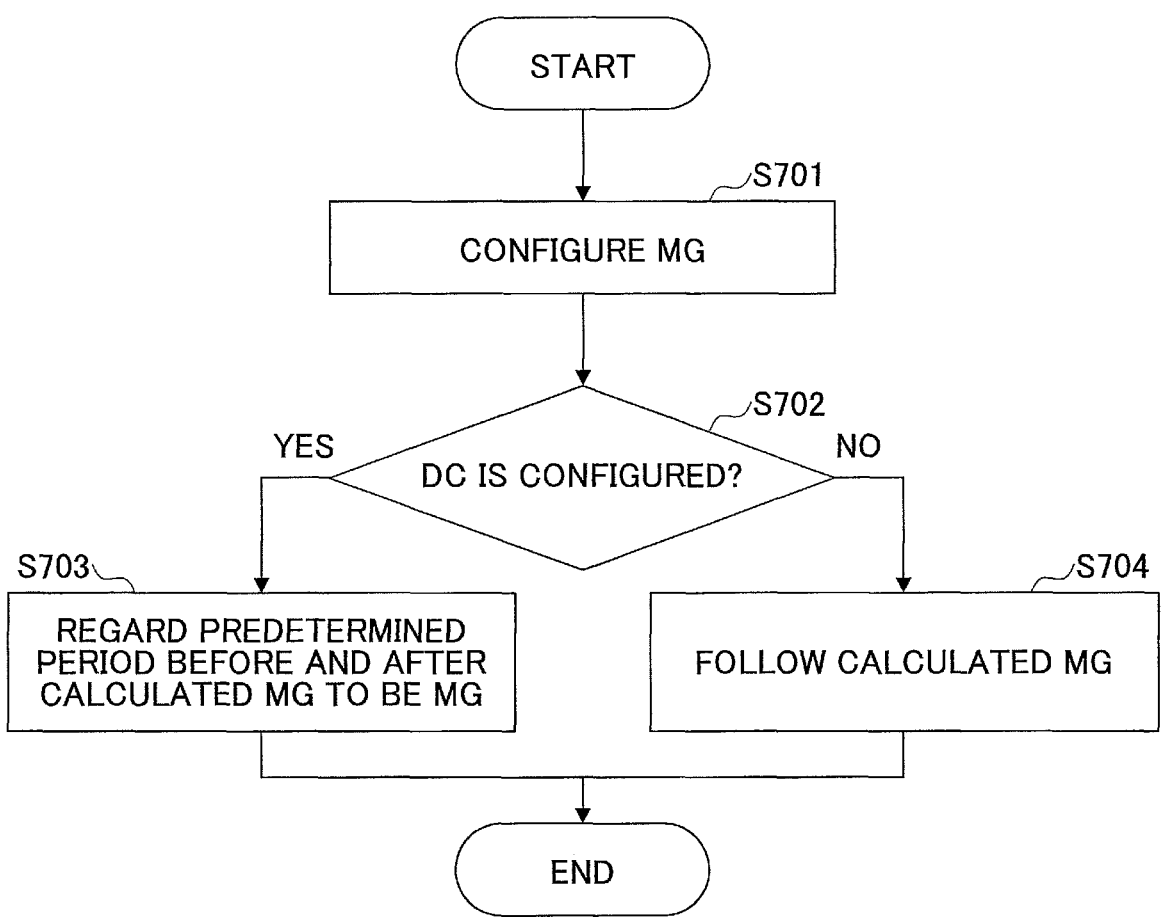
FIG. 18 is a flowchart showing an operation example of a user apparatus UE.

FIG. 18 shows a flowchart of an operation example on the handling method example 1 in the case where there is a difference in subframe boundaries.

In step 701, the measurement control unit 104 of the user apparatus UE receives configuration information of a measurement gap (MG) from the base station MeNB to be configured with a measurement gap.

The measurement control unit 104 inquiries to the DC/CA management unit 103 to check whether DC is configured or not, that is, an MCG and an SCG are configured or not (step 702).

When DC is configured (Yes of step 702), the process goes to step 703, and the measurement control unit 104 calculates a measurement gap (SFN/subframe number where the measurement gap starts) of the MCG, and further, calculates a measurement gap (SFN/subframe number where the measurement gap starts) of the SCG using the difference information, and further, regards, for each of the MCG and the SCG, a predetermined period (example: 1 ms) before and after the calculated measurement gap as a measurement gap to perform control of inhibiting transmission and reception in the measurement gap.

On the other hand, when DC is not configured (No in step 702), the process goes to step 704, and the measurement control unit 104 calculates a measurement gap (SFN/subframe number where a measurement gap starts) of a serving cell, and performs control to inhibit transmission and reception in the calculated measurement gap.

Figure 19:
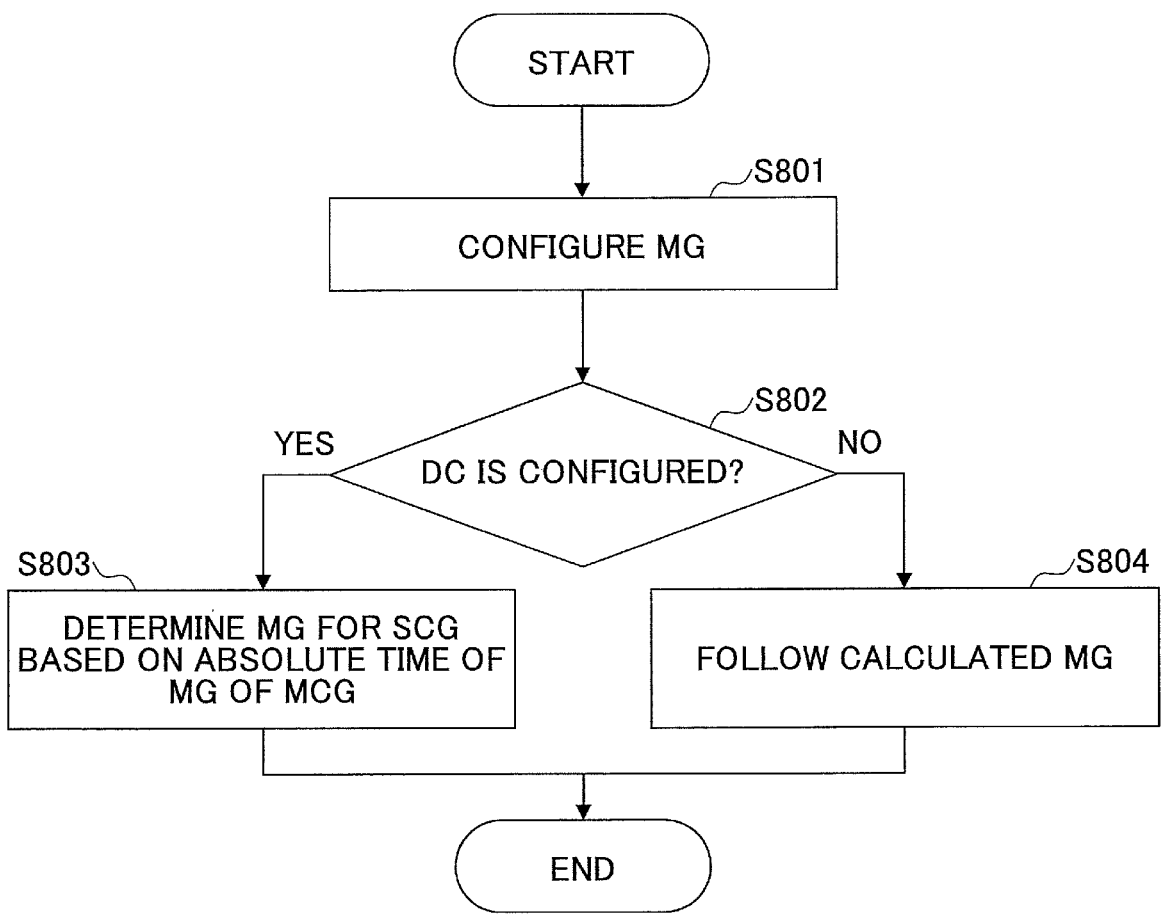
FIG. 19 is a flowchart showing an operation example of a user apparatus UE.

FIG. 19 shows a flowchart of an operation example on the handling method example 2 in the case where there is a difference in subframe boundaries.

In step 801, the measurement control unit 104 of the user apparatus UE receives configuration information of a measurement gap (MG) from the base station MeNB to be configured with a measurement gap.

The measurement control unit 104 inquiries to the DC/CA management unit 103 to check whether DC is configured or not, that is, an MCG and an SCG are configured or not (step 802).

When DC is configured (Yes of step 802), the process goes to step 803, and the measurement control unit 104 calculates a measurement gap (SFN/subframe number where the measurement gap starts) of the MCG. The measurement control unit 104 obtains an absolute time (example: time T of FIG. 15) of the measurement gap of the MCG, and calculates a measurement gap for the SCG based on the absolute time. The measurement control unit 104 performs control of inhibiting transmission and reception in the measurement gap in each of the MCG and the SCG. That is, a measurement gap is configured in each of the MCG and the SCG.

On the other hand, when DC is not configured (No in step 802), the process goes to step 804, and the measurement control unit 104 calculates a measurement gap (SFN/subframe number where a measurement gap starts) of a serving cell, and performs control to inhibit transmission and reception in the calculated measurement gap.

The configuration (functional segmentation) of the apparatus shown in FIG. 16 is merely an example, and, the implementation method (concrete arrangement of functional units, and the like) is not limited to a specific implementation method as long as the apparatus can execute processing described in the present embodiment. For example, the user apparatus of the present embodiment can be configured as an apparatus having the following functional means.

That is, the user apparatus of the present embodiment is configured as a user apparatus for use in a mobile communication system including a first base station and a second base station that communicate with the user apparatus by inter-base station carrier aggregation, including:

measurement means configured to measure a time difference between a subframe in the first base station and a subframe in the second base station; and notification means configured, when detecting a predetermined notification trigger, to notify the first base station or the second base station of time difference information on the time difference measured by the measurement means. According to this configuration, it becomes possible that a base station side ascertains information of a time difference between a subframe of a first base station and a subframe of a second base station.

The predetermined notification trigger is, for example, that the user apparatus receives a configuration signal for performing the inter-base station carrier aggregation from the first base station or the second base station. According to this configuration, the user apparatus can notify of time difference information when there is a possibility that a time difference occurs.

The predetermined notification trigger may be that an event is triggered, in the user apparatus, for transmitting a measurement report when reception quality in a residing cell deteriorates below a predetermined threshold. According to this configuration, the user apparatus can notify of time difference information when there is a possibility that a measurement gap is set.

The predetermined notification trigger may be to receive configuration information of a measurement gap from the first base station or the second base station. According to this configuration, the user apparatus can notify of time difference information only when a measurement gap is configured.

Also, the user apparatus of the present embodiment may be configured as a user apparatus for use in a mobile communication system including a first base station and a second base station that communicate with the user apparatus by inter-base station carrier aggregation, including:

reception means configured to receive configuration information of a measurement gap from the first base station or the second base station; and measurement control means configured to configure a measurement gap for the first base station based on the configuration information, and to configure a measurement gap that is longer than the measurement gap for the first base station by 1 subframe as a measurement gap for the second base station. According to this configuration, unnecessary DL reception/UL transmission due to a difference of subframe boundaries can be avoided, so that deterioration of resource use efficiency and the like can be prevented.

Also, the user apparatus of the present embodiment may be configured as a user apparatus for use in a mobile communication system including a first base station and a second base station that communicate with the user apparatus by inter-base station carrier aggregation, including:

reception means configured to receive configuration information of a measurement gap from the first base station or the second base station; and measurement control means configured to configure a measurement gap for the first base station based on the configuration information, and to configure subframes that overlap with subframes that become the measurement gap for the first base station as a measurement gap for the second base station. According to this configuration, unnecessary DL reception/UL transmission due to a difference of subframe boundaries can be avoided, so that deterioration of resource use efficiency and the like can be prevented.

The measurement control means may be configured to calculate the measurement gap for the first base station based on the configuration information, to obtain an absolute time of the measurement gap, and to calculate the measurement gap for the second base station based on the absolute time. According to this configuration, increase of communication unavailable period due to a difference of subframe boundaries can be decreased.

<Base Station eNB>

Figure 20:
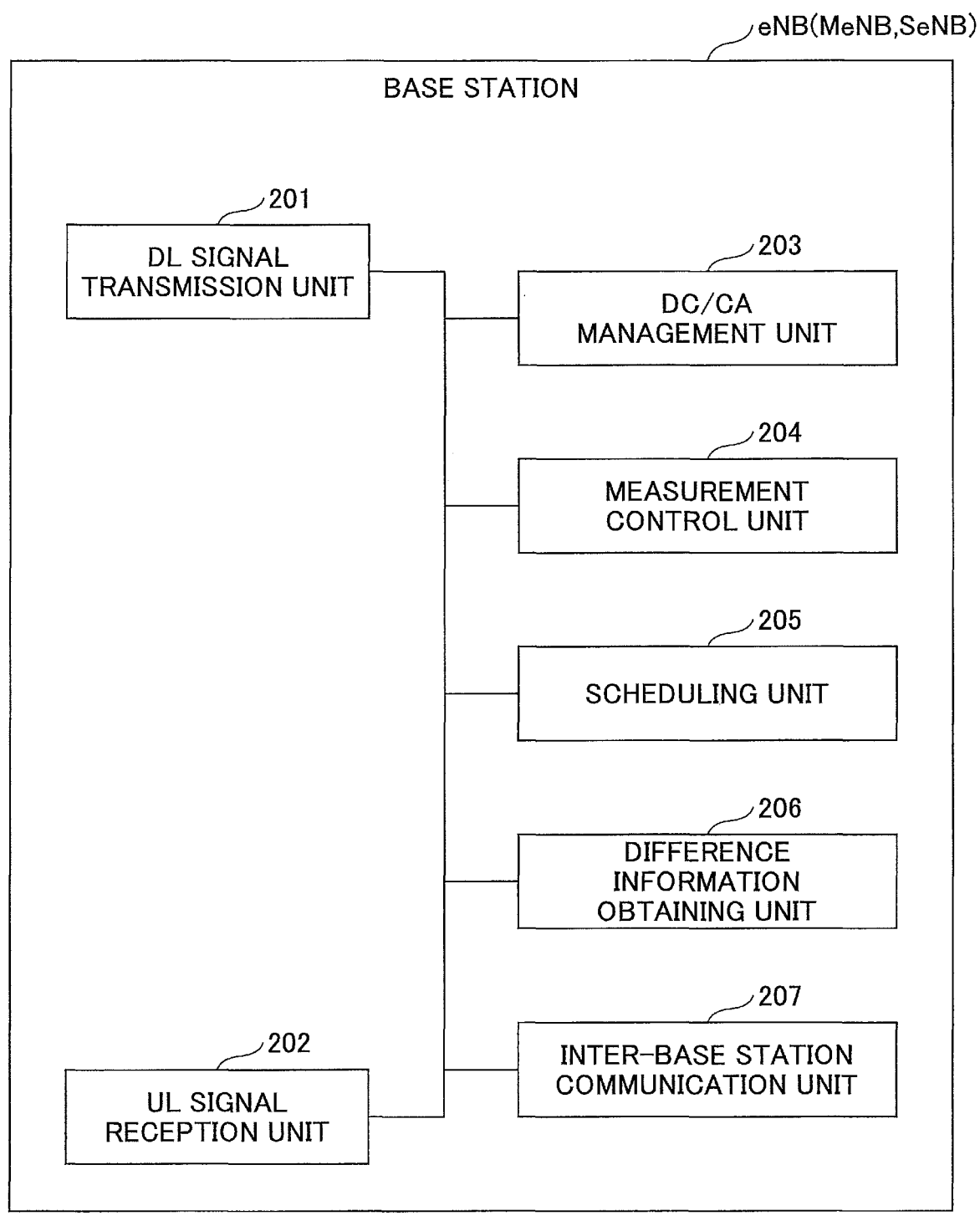
FIG. 20 is a diagram showing a configuration example of a base station eNB (MeNB, SeNB) in an embodiment of the present invention.

FIG. 20 shows a configuration example of the base station eNB that executes operation described so far. Since the base stations of MeNB and SeNB have basically the same configuration, FIG. 20 shows a configuration that can be applied to any of the MeNB and the SeNB. When RRC connection with the user apparatus UE is performed only by the base station MeNB, a function for performing measurement configuration by an RRC signal may be provided only in the measurement control unit 204 of the base station MeNB.

FIG. 20 only shows functional units especially related to the embodiment of the present invention in the base station eNB, and the base station eNB also includes at least functions, not shown in the figure, for performing operation complying with LTE.

As shown in FIG. 20, the base station eNB of the present embodiment includes a DL signal transmission unit 201, an UL signal reception unit 202, a DC/CA management unit 203, a measurement control unit 204, a scheduling unit 205, a difference information obtaining unit 206 and an inter-base station communication unit 207.

The UL signal transmission unit 201 generates a radio signal from transmission information, and transmits the radio signal to a user apparatus UE. The UL signal reception unit 202 receives a radio signal from a user apparatus UE, and extracts information from the radio signal. The DC/CA management unit 203 performs management (holding identification and state of configured CCs, and the like), addition, deletion, activation, deactivation and the like of each cell (CC) that forms DC.

The measurement control unit 204 transmits, to the user apparatus UE, measurement configuration information (instruction of Event, configuration of measurement gap and the like). Also, the measurement control unit 204 transmits and receives (shares) measurement configuration information with another base station (example: SeNB for MeNB, MeNB for SeNB, or the like) via the inter-base station communication unit 207. Also, the measurement control unit 204 calculates a measurement gap (SFN/subframe number where a measurement gap starts) based on configuration of a measurement gap for the user apparatus UE, and notifies the scheduling unit 205 of the period of the measurement gap. Calculation of the measurement gap includes correction by difference information in the SeNB and addition of a period regarded as a measurement gap, and the like.

The scheduling unit 205 performs control of not performing UL/DL scheduling during a period of the measurement gap (when there is a period regarded as a measurement gap, it is included) notified from the measurement control unit 204.

The difference information obtaining unit 206 obtains difference information from the user apparatus UE or from another base station (example: MeNB for SeNB), and passes the difference information to the measurement control unit 204. The inter-base station communication unit 207 performs transmission and reception of information with another base station.

Although the base station eNB can perform all operations of the base station (MeNB, SeNB) described so far, some operation examples are described in the following.

Figure 21:
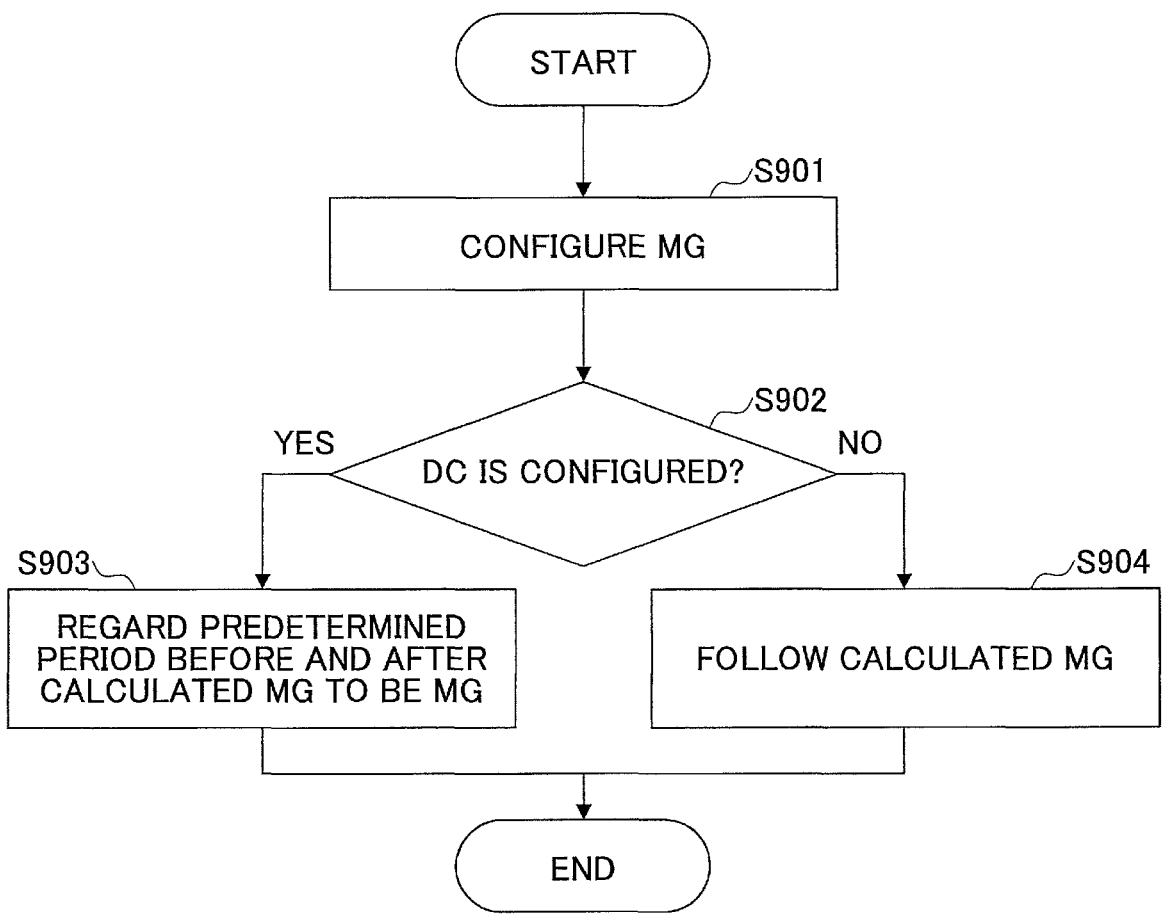
FIG. 21 is a flowchart showing an operation example of a base station eNB (MeNB, SeNB)

FIG. 21 shows a flowchart of an operation example on the handling method example 1 in the case where there is a difference in subframe boundaries.

In step 901, the measurement control unit 204 of the base station eNB transmits configuration information of a measurement gap (MG) to the user apparatus UE to configure the user apparatus UE with the measurement gap.

The measurement control unit 204 inquiries to the DC/CA management unit 203 to check whether DC is configured or not, that is, whether the base station eNB is the MeNB or the SeNB (whether MCG and SCG are configured by the base station eNB and another base station) (step 902).

When DC is configured (Yes in step 902). the process goes to step 903, so that the measurement control unit 204 calculates a measurement gap (SFN/subframe number where the measurement gap starts) of the MCG (when the base station eNB is MeNB). When the base station eNB is an SeNB, the measurement control unit 204 calculates the measurement gap of the MCG, and calculates a measurement gap (SFN/subframe number where the measurement gap starts) of the SCG using difference information received from the MeNB, for example. Further, in both cases, a predetermined period (example: 1 ms) before and after the calculated measurement gap is regarded as a measurement gap, so that the scheduling unit 205 performs control of not performing UL/DL scheduling in the measurement gap.

On the other hand, when DC is not configured (No in step 902), the process goes to step 904, and the measurement control unit 204 calculates a measurement gap (SFN/subframe number where the measurement gap starts) of a serving cell, and performs control of not performing UL/DL scheduling in the calculated measurement gap.

Figure 22:
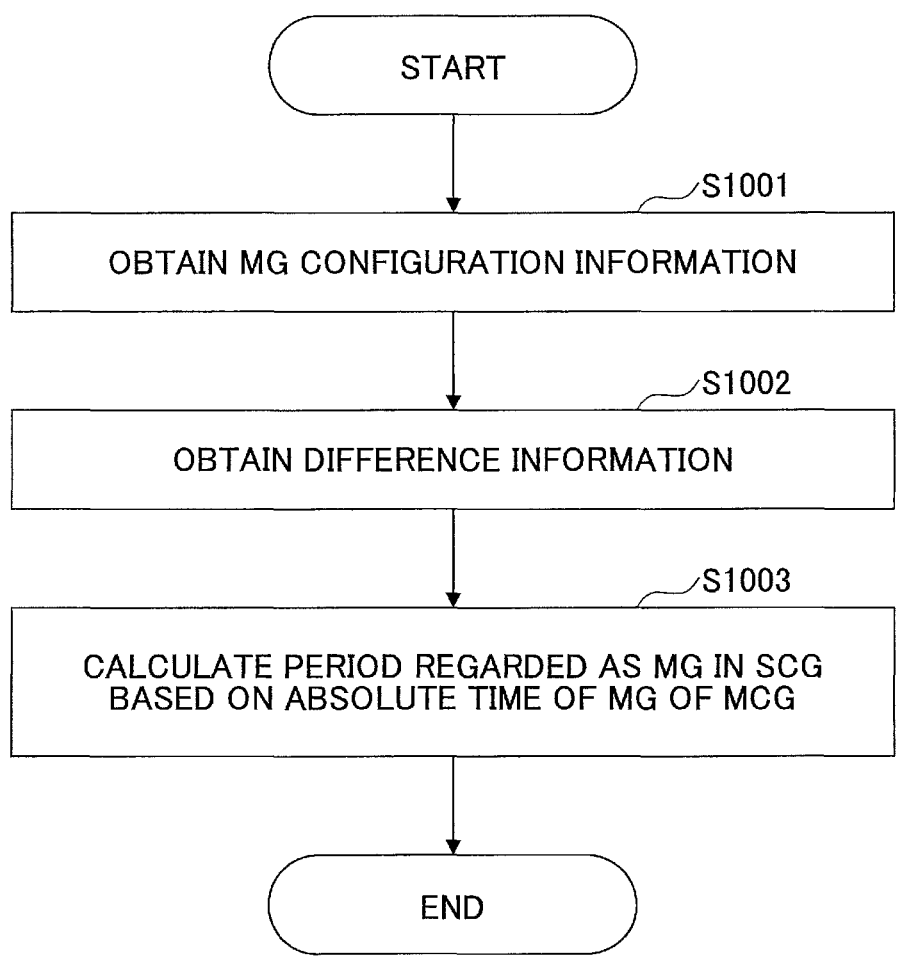
FIG. 22 is a flowchart showing an operation example of a base station SeNB.

FIG. 22 shows a flowchart of an operation example on the handling method example 2 in the case where there is a difference in subframe boundaries. The operation in FIG. 22 is an operation example when the base station eNB is an SeNB.

In step 1001, the measurement control unit 204 receives configuration information of a measurement gap (MG) from the base station MeNB (or the user apparatus UE). The measurement control unit 104 calculates a measurement gap (SFN/subframe number where the measurement gap starts) of the MCG, and obtains an absolute time (example: time T of FIG. 15) of the measurement gap of the MCG, and calculates a measurement gap (a period regarded as a measurement gap) for the SCG based on the absolute time. The scheduling unit 205 performs control of not performing scheduling in the period.

The configuration (functional segmentation) of the apparatus shown in FIG. 20 is merely an example, and, the implementation method (concrete arrangement of functional units, and the like) is not limited to a specific implementation method as long as the apparatus can execute processing described in the present embodiment. For example, the base station of the present embodiment can be configured as an apparatus having the following functional units.

That is, the base station in the present embodiment is configured as a base station used as a second base station in a mobile communication system including a first base station and the second base station that communicate with a user apparatus by an inter-base station carrier aggregation, including:

reception means configured to receive, from the user apparatus or the first base station, time difference information on a time difference between a subframe in the first base station and a subframe in the second base station; and measurement control means configured to receive configuration information of a measurement gap from the user apparatus or the first base station, to calculate a measurement gap for the base station in the user apparatus based on the configuration information and the time difference information, and to regard a predetermined period before and after the measurement gap as a measurement gap. According to this configuration, it becomes possible that a base station ascertains information of a time difference between a subframe of a first base station and a subframe of a second base station, and unnecessary scheduling due to a difference of subframe boundaries can be avoided, so that deterioration of resource use efficiency and the like can be prevented.

Also, the base station of the present embodiment is configured as a base station used as a second base station in a mobile communication system including a first base station and the second base station that communicate with a user apparatus by an inter-base station carrier aggregation, including:

reception means configured to receive, from the user apparatus or the first base station, time difference information on a time difference between a subframe in the first base station and a subframe in the second base station; and measurement control means configured to calculate an absolute time of a measurement gap for the first base station in the user apparatus based on configuration information of the measurement gap and the time difference information received by the reception means, and to calculate a measurement gap for the base station in the user apparatus based on the absolute time. According to this configuration, it becomes possible that a base station ascertains information of a time difference between a subframe of a first base station and a subframe of a second base station, and increase of communication unavailable period due to a difference of subframe boundaries can be decreased.

In the following, configurations disclosed in the present specification are recited as examples.

(Item 1)

A user apparatus for use in a mobile communication system including a first base station and a second base station that communicate with the user apparatus by inter-base station carrier aggregation, including:

measurement means configured to measure a time difference between a subframe in the first base station and a subframe in the second base station; and notification means configured, when detecting a predetermined notification trigger, to notify the first base station or the second base station of time difference information on the time difference measured by the measurement means.

(Item 2)

The user apparatus as described in item 1, wherein the predetermined notification trigger is that the user apparatus receives a configuration signal for performing the inter-base station carrier aggregation from the first base station or the second base station.

(Item 3)

The user apparatus as described in item 1, wherein the predetermined notification trigger is that an event is triggered, in the user apparatus, for transmitting a measurement report when reception quality in a residing cell deteriorates below a predetermined threshold.

(Item 4)

The user apparatus as described in item 1, wherein the predetermined notification trigger is to receive configuration information of a measurement gap from the first base station or the second base station.

(Item 5)

The user apparatus as described in any one of items 1-4, including measurement control means configured to receive configuration information of a measurement gap from the first base station or the second base station, to calculate a measurement gap for the first base station based on the configuration information, to calculate a measurement gap for the second base station based on the configuration information and the time difference information, and to regard, for each calculated measurement gap, a predetermined period before and after the measurement gap as a measurement gap.

(Item 6)

The user apparatus as described in any one of items 1-4, including measurement control means configured to receive configuration information of a measurement gap from the first base station or the second base station, to calculate a measurement gap for the first base station based on the configuration information, to obtain an absolute time of the measurement gap, and to calculate a measurement gap for the second base station based on the absolute time.

(Item 7)

The user apparatus as described in any one of items 1-4, wherein the time difference information is configuration information that is used, in the second base station, for calculating a measurement gap that is obtained by correcting the time difference from the measurement gap for the first base station.

(Item 8)

A base station used as a second base station in a mobile communication system including a first base station and the second base station that communicate with a user apparatus by an inter-base station carrier aggregation, including:

reception means configured to receive, from the user apparatus or the first base station, time difference information on a time difference between a subframe in the first base station and a subframe in the second base station; and measurement control means configured to receive configuration information of a measurement gap from the user apparatus or the first base station, to calculate a measurement gap for the base station in the user apparatus based on the configuration information and the time difference information, and to regard a predetermined period before and after the measurement gap as a measurement gap.

(Item 9)

A base station used as a second base station in a mobile communication system including a first base station and the second base station that communicate with a user apparatus by an inter-base station carrier aggregation, including:

reception means configured to receive, from the user apparatus or the first base station, time difference information on a time difference between a subframe in the first base station and a subframe in the second base station; and measurement control means configured to calculate an absolute time of a measurement gap for the first base station in the user apparatus based on configuration information of the measurement gap and the time difference information received by the reception means, and to calculate a measurement gap for the base station in the user apparatus based on the absolute time.

(Item 10)

A time difference information notification method executed by a user apparatus for use in a mobile communication system including a first base station and a second base station that communicate with the user apparatus by inter-base station carrier aggregation, comprising:

a measurement step of measuring a time difference between a subframe in the first base station and a subframe in the second base station; and a notification step of, when detecting a predetermined notification trigger, notifying the first base station or the second base station of time difference information on the time difference measured by the measurement step.

The functional configuration of the user apparatus described in the present embodiment may be realized, in the user apparatus UE including a CPU and a memory, by executing a program by the CPU (processor), or may be realized by hardware such as hardware circuits including logics of processing described in the present embodiment, or may be configured by coexistence of a program and hardware.

The functional configuration of the base station described in the present embodiment may be realized, in the base station eNB including a CPU and a memory, by executing a program by the CPU (processor), or may be realized by hardware such as hardware circuits including logics of processing described in the present embodiment, or may be configured by coexistence of a program and hardware.

In the above, the embodiment of the present invention has been explained. However, the disclosed invention is not limited to the embodiment. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus and the base station have been explained by using functional block diagrams. However, such an apparatus may be implemented in hardware, software, or a combination thereof.

The software that operates according to the present invention may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international patent application claims priority based on Japanese patent application No. 2014-124835, filed in the JPO on Jun. 17, 2014, and the entire contents of the Japanese patent application No. 2014-124835 are incorporated herein by reference.

DESCRIPTION OF REFERENCE SIGNS

UE user apparatus
MeNB, SeNB base station
101 DL signal reception unit
102 UL signal transmission unit
103 DC/CA management unit
104 measurement control unit
105 difference measurement unit
106 difference information notification unit
201 DL signal transmission unit
202 UL signal reception unit
203 DC/CA management unit
204 measurement control unit
205 scheduling unit
206 difference information obtaining unit
207 inter-base station communication unit

The invention claimed is:

1. A user apparatus in a mobile communication system including a first base station and a second base station that communicate with the user apparatus by dual connectivity, comprising:
 a processor coupled to a receiver that measures a time difference between a subframe in the first base station and a subframe in the second base station; and
 when a predetermined notification trigger is detected, a transmitter transmits a notification to the first base station or the second base station of time difference information on the time difference measured by the processor,
 wherein the predetermined notification trigger that triggers the notification to the first base station or the second base station of the time difference information is that the user apparatus receives an RRCConnectionReconfiguration message that is a configuration signal for performing the dual connectivity from the first base station or the second base station, and
 wherein the RRCConnectionReconfiguration message comprises a measurement gap configuration.

2. A time difference information notification method executed by a user apparatus in a mobile communication system including a first base station and a second base station that communicate with the user apparatus by dual connectivity, comprising:
 measuring a time difference between a subframe in the first base station and a subframe in the second base station; and
 notifying the first base station or the second base station of a time difference information on the time difference measured, when detecting a predetermined notification trigger,
 wherein the predetermined notification trigger that triggers a notification to the first base station or the second base station of the time difference information is that the user apparatus receives an RRCConnectionReconfiguration message that is a configuration signal for performing the dual connectivity from the first base station or the second base station, and
 wherein the RRCConnectionReconfiguration message comprises a measurement gap configuration.

* * * * *